United States Patent
Florey et al.

(10) Patent No.: US 12,263,890 B2
(45) Date of Patent: Apr. 1, 2025

(54) HIGH-FORMING MULTI-LAYER ALUMINUM ALLOY PACKAGE

(71) Applicant: Novelis Inc., Atlanta, GA (US)

(72) Inventors: Guillaume Florey, Veyras (CH);
Cyrille Bezencon, Chermignon (CH);
Corrado Bassi, Salgesch (CH);
Juergen Timm, Steisslingen (DE);
Jean-Francois Despois, Grone (CH);
Jacques Stadlin, Pont-de-la-Morge (CH)

(73) Assignee: NOVELIS INC., Atlanta, GA (US)

( * ) Notice: Subject to any disclaimer, the term of this patent is extended or adjusted under 35 U.S.C. 154(b) by 0 days.

(21) Appl. No.: 16/875,472

(22) Filed: May 15, 2020

(65) Prior Publication Data

US 2020/0277011 A1     Sep. 3, 2020

Related U.S. Application Data

(62) Division of application No. 15/288,088, filed on Oct. 7, 2016, now Pat. No. 10,689,041.

(Continued)

(51) Int. Cl.
*C22C 21/00*     (2006.01)
*B22D 7/00*     (2006.01)
(Continued)

(52) U.S. Cl.
CPC ........... *B62D 29/008* (2013.01); *B22D 7/005* (2013.01); *B32B 15/016* (2013.01); *C22C 21/00* (2013.01);
(Continued)

(58) Field of Classification Search
None
See application file for complete search history.

(56) References Cited

U.S. PATENT DOCUMENTS

| | | | |
|---|---|---|---|
| 4,174,232 A | 11/1979 | Lenz et al. | |
| 4,260,419 A | 4/1981 | Robertson | |

(Continued)

FOREIGN PATENT DOCUMENTS

| | | |
|---|---|---|
| CN | 102168213 | 8/2011 |
| EP | 0272528 | 6/1988 |

(Continued)

OTHER PUBLICATIONS

Davis, J.R. Metals Handbook Desk Edition, "Chemical Compositions and International Designations", 2nd edition, p. 426-429. (Year: 1998).*

(Continued)

*Primary Examiner* — George Wyszomierski
*Assistant Examiner* — Janell C Morillo
(74) *Attorney, Agent, or Firm* — Kilpatrick Townsend & Stockton LLP

(57) ABSTRACT

Provided herein are novel, high-forming multi-layer aluminum alloy packages that include a core layer and one or more cladding layers. The alloy packages have excellent bake-hardening properties and are highly recyclable. The packages also display exceptional bendability and elongation properties. Also provided herein are novel aluminum alloy compositions for use as cladding layers. The compositions contain up to 0.6 wt. % Fe and one or more of Mn, Ni, Ti, Co, Nb, Cr, V, Zr, Hf and Ta.

16 Claims, 25 Drawing Sheets

Related U.S. Application Data

(60) Provisional application No. 62/302,218, filed on Mar. 2, 2016, provisional application No. 62/241,958, filed on Oct. 15, 2015.

(51) Int. Cl.
  *B32B 15/01* (2006.01)
  *B62D 29/00* (2006.01)
  *C22C 21/02* (2006.01)
  *C22C 21/08* (2006.01)
  *C22F 1/04* (2006.01)
  *C22F 1/043* (2006.01)
  *C22F 1/047* (2006.01)

(52) U.S. Cl.
  CPC .............. *C22C 21/02* (2013.01); *C22C 21/08* (2013.01); *C22F 1/04* (2013.01); *C22F 1/043* (2013.01); *C22F 1/047* (2013.01)

(56) References Cited

U.S. PATENT DOCUMENTS

| | | | |
|---|---|---|---|
| 5,344,507 | A | 9/1994 | Masumoto et al. |
| 6,117,252 | A | 9/2000 | Barlat et al. |
| 6,503,446 | B1 * | 1/2003 | Ren .................... C22C 21/00 |
| | | | 420/553 |
| 7,472,740 | B2 | 1/2009 | Anderson et al. |
| 7,748,434 | B2 | 7/2010 | Wagstaff |
| 8,927,113 | B2 | 1/2015 | Anderson et al. |
| 10,280,495 | B2 | 5/2019 | Kokubo et al. |
| 10,533,243 | B2 | 1/2020 | Newman et al. |
| 10,550,455 | B2 | 2/2020 | Hosch et al. |
| 2002/0034454 | A1 | 3/2002 | Fujita et al. |
| 2005/0011630 | A1 | 1/2005 | Anderson et al. |
| 2005/0028894 | A1 | 2/2005 | Hoffmann et al. |
| 2005/0288894 | A1 | 12/2005 | Vorenkamp et al. |
| 2008/0041501 | A1 | 2/2008 | Platek et al. |
| 2009/0214891 | A1 | 8/2009 | Lahaye |
| 2010/0129683 | A1 | 5/2010 | Lin et al. |
| 2010/0279143 | A1 | 11/2010 | Kamat et al. |
| 2010/0316887 | A1 | 12/2010 | Dwenger |
| 2011/0165437 | A1 | 7/2011 | Timm et al. |
| 2013/0068352 | A1 | 3/2013 | Siles et al. |
| 2013/0302642 | A1 | 11/2013 | Ren |
| 2014/0193666 | A1 | 7/2014 | Brinkman et al. |
| 2014/0322558 | A1 | 10/2014 | Takeda et al. |
| 2014/0356647 | A1 * | 12/2014 | Takeda ................. C22F 1/057 |
| | | | 428/654 |
| 2015/0213914 | A1 | 7/2015 | Sekiya et al. |
| 2015/0217813 | A1 | 8/2015 | Smeyers et al. |
| 2015/0224556 | A1 * | 8/2015 | Brinkman ............... C22C 21/08 |
| | | | 428/654 |
| 2016/0002761 | A1 | 1/2016 | De Smet |
| 2016/0201158 | A1 | 7/2016 | Kamat et al. |
| 2017/0044649 | A1 | 2/2017 | Selepack |
| 2017/0283913 | A1 * | 10/2017 | Koshino ................. C22C 21/08 |
| 2018/0122528 | A1 * | 5/2018 | Yoshida .................. C22C 21/02 |
| 2019/0330716 | A1 | 10/2019 | Kuramoto et al. |
| 2019/0376165 | A1 | 12/2019 | Wen et al. |
| 2020/0023417 | A1 | 1/2020 | Das et al. |
| 2020/0024713 | A1 | 1/2020 | Das et al. |

FOREIGN PATENT DOCUMENTS

| | | | | |
|---|---|---|---|---|
| EP | 2055473 | A1 * | 5/2009 | ........... B22D 11/007 |
| EP | 2156945 | | 2/2010 | |
| EP | 2570257 | | 3/2013 | |
| EP | 2592165 | B1 * | 9/2014 | ........... B23K 1/0008 |
| EP | 2964800 | B1 | 8/2017 | |
| FR | 2826979 | | 1/2003 | |
| JP | 512547 | | 10/1976 | |
| JP | 55161043 | | 12/1980 | |
| JP | 55161043 | A * | 12/1980 | |
| JP | 62158032 | | 7/1987 | |
| JP | H565582 | | 3/1993 | |
| JP | 05125472 | | 5/1993 | |
| JP | H5171324 | | 7/1993 | |
| JP | H0754088 | | 2/1995 | |
| JP | H08260086 | | 10/1996 | |
| JP | 10265881 | | 10/1998 | |
| JP | 1171623 | | 3/1999 | |
| JP | 2002362046 | | 12/2002 | |
| JP | 2002363046 | | 12/2002 | |
| JP | 2004043938 | A | 2/2004 | |
| JP | 2005238737 | | 9/2005 | |
| JP | 2006219763 | | 8/2006 | |
| JP | 2007516344 | | 6/2007 | |
| JP | 2009249727 | | 10/2009 | |
| JP | 2010189730 | | 9/2010 | |
| JP | 2014040659 | | 3/2014 | |
| JP | 2014529687 | | 11/2014 | |
| JP | 2015071823 | | 4/2015 | |
| JP | 6039351 | | 11/2016 | |
| KR | 20140092901 | | 7/2014 | |
| KR | 20170125984 | A | 11/2017 | |
| KR | 20180014156 | A | 2/2018 | |
| KR | 20180021367 | A | 3/2018 | |
| WO | 9713882 | | 4/1997 | |
| WO | 9814626 | A1 | 4/1998 | |
| WO | 02090609 | | 11/2002 | |
| WO | 2005108633 | A2 | 11/2005 | |
| WO | 2009093559 | A1 | 7/2009 | |
| WO | 2014128023 | | 8/2014 | |
| WO | 2014155818 | | 10/2014 | |
| WO | 2017120117 | A1 | 7/2017 | |
| WO | 2018011069 | | 1/2018 | |
| WO | 2019010284 | | 1/2019 | |
| WO | 2019025227 | A1 | 2/2019 | |
| WO | 2020023367 | | 1/2020 | |

OTHER PUBLICATIONS

South African Application No. 2019/00565, Notice of Allowance, mailed Apr. 14, 2021, 1 page.
Canadian Application No. 3,001,907, Notice of Allowance, Mailed on Dec. 2, 2020, 1 page.
Israeli Application No. 258504, Office Action, Mailed on Nov. 2, 2020, 4 pages.
"International Alloy Designations and Chemical Composition Limits for Wrought Aluminum and Wrought Aluminum Alloys", The Aluminum Association, Inc., Registration Record Series, Teal Sheets, Feb. 1, 2009, 35 pages.
"Precision Aluminum Plate Backer", Takach Press Corp., Available Online at https://www.takachpress.com/access/backer.htm, Nov. 20, 2019, 2 pages.
U.S. Appl. No. 15/288,088, "Advisory Action", Apr. 16, 2019, 6 pages.
U.S. Appl. No. 15/288,088, "Final Office Action", Jan. 9, 2019, 10 pages.
U.S. Appl. No. 15/288,088, "First Action Interview Pilot Program Pre-Interview Communication", Sep. 28, 2018, 5 pages.
U.S. Appl. No. 15/288,088, "Non-Final Office Action", Jul. 22, 2019, 9 pages.
U.S. Appl. No. 15/288,088, "Notice of Allowance", Feb. 28, 2020, 8 pages.
U.S. Appl. No. 15/288,088 , "Restriction Requirement", Apr. 12, 2018, 6 pages.
Australian Application No. 2016338654, "First Examination Report", Apr. 2, 2019, 4 pages.
Australian Application No. 2016338654, "Second Examination Report", Oct. 8, 2019, 3 pages.
Brazilian Application No. 112018007354-7, "Office Action", Mar. 3, 2020, 4 pages.
Bray, "Aluminum Mill and Engineered Wrought Products", ASM Handbook, Properties and Selection: Nonferrous Alloys and Special-Purpose Materials, ASM International, vol. 2, 1990, pp. 29-61.
Canadian Application No. 3,001,907, "Office Action", Feb. 28, 2020, 3 pages.

(56) References Cited

OTHER PUBLICATIONS

Canadian Application No. 3,001,907, "Office Action", Jun. 19, 2019, 4 pages.
Chinese Application No. 201680060095.3, "Office Action", May 21, 2019, 19 pages.
Chinese Application No. 201680060095.3, "Office Action", Jan. 10, 2020, 21 pages.
Davis, "Aluminum and Aluminum Alloys", ASM International Handbook Committee, 1993, 3 pages.
European Application No. 16788297.6, "Office Action", Apr. 4, 2019, 5 pages.
Japanese Application No. 2018-519325, "Office Action", Mar. 19, 2019, 17 pages.
Japanese Application No. 2018-519325, "Office Action", Nov. 26, 2019, 6 pages.
Korean Application No. 10-2018-7011157, "Office Action", Dec. 18, 2019, 14 pages.
Korean Application No. 10-2018-7011157, "Office Action", Feb. 26, 2020, 7 pages.
Kazakhstan Application No. 2018/0286.1, "Notice of Decision to Grant", Aug. 27, 2019, 3 pages.
Kazakhstan Application No. 2018/0286.1, "Office Action", May 8, 2019, 7 pages.
Nwambu et al., "Effect of Molybdenum and Cobalt Addition on Structure and Mechanical Properties of Aluminium—12.5% Silicon Alloy", International Journal of Engineering Science Invention, vol. 3, No. 4, Apr. 2014, pp. 20-24.
PCT/US2016/055922, "International Preliminary Report on Patentability", Apr. 26, 2018, 13 pages.
PCT/US2016/055922, "International Search Report and Written Opinion", Jan. 26, 2017, 19 pages.
Sani et al., "Effect of Chromium and Cobalt Additions on the Corrosion Resistance of Aluminium Silicon Iron Alloy (Al—Si—Fe)", International Journal of Scientific & Engineering Research, vol. 3, Issue 12, Dec. 2012, pp. 1-10.
Sha et al., "Effects of Co Addition on Fe-Bearing Intermetallic Compounds and Mechanical Properties of Alsi20cu2ni1fe0.7-1 Alloys", Journal of Alloys and Compounds, vol. 551, 2013, pp. 468-474.
Sweet et al., "Hot Tear Susceptibility of Al—Mg—Si—Fe Alloys with Varying Iron Contents", Metallurgical and Materials Transactions a: Physical Metallurgy and Materials Science, vol. 44A, Dec. 2013, pp. 5396-5407.
Ukrainian Application No. a201805316 , "Office Action", Mar. 30, 2020, 3 pages.
Ukrainian Application No. a201805316 , "Office Action", Nov. 25, 2019, 6 pages.
European Application No. 16788297.6, Notice of Decision to Grant, Mailed on Jun. 18, 2020, 2 pages.
Japanese Application No. 2018-519325, Office Action, Mailed on May 19, 2020, 5 pages.
Korean Application No. 10-2018-7011157, Office Action, Mailed on May 3, 2020, 12 pages.
South African Application No. 2018/02344, Notice of Allowance, Mailed on Jun. 19, 2020, 1 page.
Japanese Application No. 2018-519325, Notice of Decision to Grant, Mailed on Oct. 27, 2020, 3 pages.
Chinese Application No. 201680060095.3, Office Action, mailed Aug. 11, 2020, 12 pages.
Korean Application No. 10-2018-7011157, Notice of Decision to Grant, mailed Sep. 22, 2020, 3 pages.
Brazilian Application No. 112018007354-7, Office Action, Mailed on Sep. 14, 2021, 7 pages.
Indian Application No. 201817012986, "First Examination Report", Oct. 21, 2021, 8 pages.
Chinese Application No. 201680060095.3 , "Office Action", Jul. 25, 2022, 12 pages.
European Application No. 19749140.0 , "Intention to Grant", Jul. 25, 2023, 8 pages.
Mexican Application No. MX/A/2018/004508 , "Notice of Allowance", Jul. 10, 2023, 2 pages.
Mexican Application No. MX/A/2018/004508 , "Office Action", Jun. 9, 2023, 4 pages.
"Norme PR NF EN ISO 6892-1", www.afnor.org, 2014, 180 pages.
"Shape Factor (Image Analysis and Microscopy)", Wikipedia, Dec. 19, 2012, 3 pages.
Belmares-Perales et al., "Addition of Iron for the Removal of the B-AlFeSi Intermetallic by Refining of α-AlFeSi Phase in an Al—7.5Si-3.6Cu Alloy", Materials Science and Engineering B, vol. 174, Oct. 25, 2010, pp. 191-195.
Claves et al., "Analysis of the Intermetallic Phase Transformation Occurring During Homogenization of 6xxx Aluminum Alloys", Materials Science Forum, vol. 396, 2002, pp. 667-674.
Davis , "ASM Specialty Handbook, Aluminum and Aluminum Alloys", ASM International, Materials Park, 1993, 13 pages.
Farhadi et al., "Parameters Controlling the Performance of Al—Si—Mg Automotive Alloys Containing Fe-intermetallics: Part II-work Hardening Behavior", Light Metals 2001 Metaux Legers, 2001, 2001, pp. 323-337.
Gao et al., "A Comparaison of Grain Size Determination by Light Microscopy and EBSD Analysis", Journal of Materials Science Letters, vol. 40, 2005, pp. 4971-4974.
Jin , "Comparison of Textures Determined by X-ray and Electron Backscatter Diffraction in Aluminium Alloy AA 6111 Sheets with Different Level of Cube Texture", Materials Science and Technology, vol. 27, No. 3, 2011, pp. 702-706.
Mondolfo , "Aluminum Alloys: Structure and Properties", Butterworth & Co. Ltd., Jan. 1, 1976, 10 pages.
Seifeddine et al., "The Influence of Cooling Rate and Manganese Content on the β-Al5FeSi Phase Formation and Mechanical Properties of Al—Si-Based Alloys", Materials Science and Engineering, vol. 490, Aug. 25, 2008, pp. 385-390.
Sweet et al., "The Effect of Iron Content on the Iron-Containing Intermetallic Phases in a Cast 6060 Aluminum Alloy", The Minerals, Metal & et Materials Society and AMS International, vol. 42A, Jul. 2011, pp. 1737-1749.
Chinese Application No. 202310208889.1 , "Office Action", May 23, 2024, 19 pages.
Chinese Application No. 202310208889.1 , "Office Action", Aug. 26, 2024, 14 pages.
Chinese Application No. 202310208889.1, "Office Action", Nov. 21, 2024, 15 pages.

\* cited by examiner

HIGH-FORMING MULTI-LAYER ALUMINUM ALLOY PACKAGE

CROSS REFERENCE TO RELATED APPLICATIONS

The present application is a divisional of U.S. application Ser. No. 15/288,088, filed Oct. 7, 2016, which claims priority to and filing benefit of U.S. Provisional Application No. 62/241,958 filed on Oct. 15, 2015 and U.S. Provisional Application No. 62/302,218 filed on Mar. 2, 2016, both of which are incorporated herein by reference in their entireties.

FIELD

Provided herein are high-forming multi-layer aluminum alloy packages.

BACKGROUND

Fine grain size is a desirable property in certain alloys because sheets prepared from such alloys can achieve small bend angles. Sheets having small bend angles, in turn, can be used to prepare products having high forming requirements. Grain size refinement has primarily been achieved by preparing alloys containing iron (Fe) in amounts of 0.7 wt. % or higher. However, the use of Fe in such high amounts results in a product with a limited recyclable content. Recyclability is an important parameter for aluminum alloys. New alloys having a fine grain structure and high recycling capabilities are needed.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings and each claim.

Provided herein are novel multi-layer aluminum alloy compositions. The multi-layer aluminum alloy compositions have high forming capabilities and bake-hardening properties. The compositions also display exceptional bendability and elongation properties. The multi-layer aluminum alloy compositions include a core layer of an aluminum containing alloy, having a first side and second side, and at least one cladding layer adjacent to the first side and/or second side of the core layer.

The aluminum alloys for use as the cladding layer(s) comprise about 0.2 to 0.6 wt. % Fe, 0.06 to 0.25 wt. % Mn, up to 0.5 wt. % Si, up to 0.5% Cu, up to 1.5 wt. % Mg, up to 0.4 wt. % Zn, one or more additional elements selected from the group consisting of Ni, Ti, Co, Nb, Cr, V, Zr, Hf and Ta, and up to 0.15 wt. % impurities, with the remainder as Al. Throughout this application, all elements are described in weight percentage (wt. %) based on the total weight of the alloy. In some cases, the aluminum alloy for use as the cladding layer(s) comprises about 0.25 to 0.55 wt. % Fe, 0.08 to 0.20 wt. % Mn, up to 0.30 wt. % Si, up to 0.25 wt. % Cu, up to 0.25 wt. % Mg, up to 0.20 wt. % Zn, one or more additional elements selected from the group consisting of Ni, Ti, Co, Nb, Cr, V, Zr, Hf and Ta, and up to 0.15 wt. % impurities, with the remainder as Al. In other cases, the aluminum alloy for use as the cladding layer(s) comprises about 0.25 to 0.55 wt. % Fe, 0.08 to 0.20 wt. % Mn, up to 0.30 wt. % Si, up to 0.25 wt. % Cu, 0.8 to 1.2 wt. % Mg, up to 0.20 wt. % Zn, one or more additional elements selected from the group consisting of Ni, Ti, Co, Nb, Cr, V, Zr, Hf and Ta, and up to 0.15 wt. % impurities, with the remainder as Al.

In some examples, the aluminum alloy for use as the cladding layer(s) comprises about 0.2 to 0.5 wt. % Fe, up to 0.25 wt. % Si, up to 0.25 wt. % Cu, 0.1 to 0.2 wt. % Mn, up to 0.1 wt. % Mg, up to 0.15 wt. % Cr, up to 0.20 wt. % Zn, up to 0.6 wt. % Ni, up to 0.12 wt. % Ti, up to 0.6 wt. % Co, up to 0.2 wt. % Nb, up to 0.18 wt. % V, up to 0.25 wt. % Zr, up to 0.30 wt. % Hf, up to 0.15 wt. % Ta and up to 0.15 wt. % impurities, with the remainder as Al.

The one or more additional elements can comprise Ni in an amount of from about 0.01 to 0.60 wt. %, Ti in an amount of from about 0.01 to 0.15 wt. %, Co in an amount of from about 0.01 to 0.60 wt. %, Nb in an amount of from about 0.01 to 0.3 wt. %, Cr in an amount of from 0.01 to 0.2 wt. %, V in an amount of from about 0.01 to 0.2 wt. %, Zr in an amount of from about 0.01 to 0.25 wt. %, Hf in an amount of from about 0.01 to 0.30 wt. % and/or Ta in an amount of from about 0.01 to 0.20 wt. %. Optionally, the combined content of Fe, Mn, Cr, Ti, Co, Ni, and/or V present in the alloy ranges from about 0.60 wt. % to 0.90 wt. %.

Also provided herein are multi-layer metal sheets comprising a core layer and one or more cladding layers. In some examples, the multi-layer metal sheets described herein comprise a core layer and a first cladding layer, wherein the first cladding layer comprises an aluminum alloy composition as described above. The core layer can comprise an AA6xxx alloy, an AA2xxx alloy, an AA5xxx alloy, or an AA7xxx alloy. The core layer has a first side and a second side, and the first cladding layer is on the first side or the second side of the core layer. The multi-layer metal sheets can further comprise a second cladding layer on the core layer, wherein the second cladding layer comprises an aluminum alloy composition as described above. In some examples, the first side of the core layer is adjacent to the first cladding layer to form a first interface and the second side of the core layer is adjacent to the second cladding layer to form a second interface.

The alloys described herein can form a sheet having a grain size of from about 10 microns to about 30 microns. In some cases, the alloys described herein can form a sheet having a grain size of from about 15 microns to about 25 microns.

Products prepared from the multi-layer metal sheets are also described herein. A product prepared from the multi-layer metal sheets can include a motor vehicle body part, such as a body side panel, or any other product.

Other objects and advantages of the invention will be apparent from the following detailed description of non-limiting examples of the invention.

DETAILED DESCRIPTION

Figure 1:
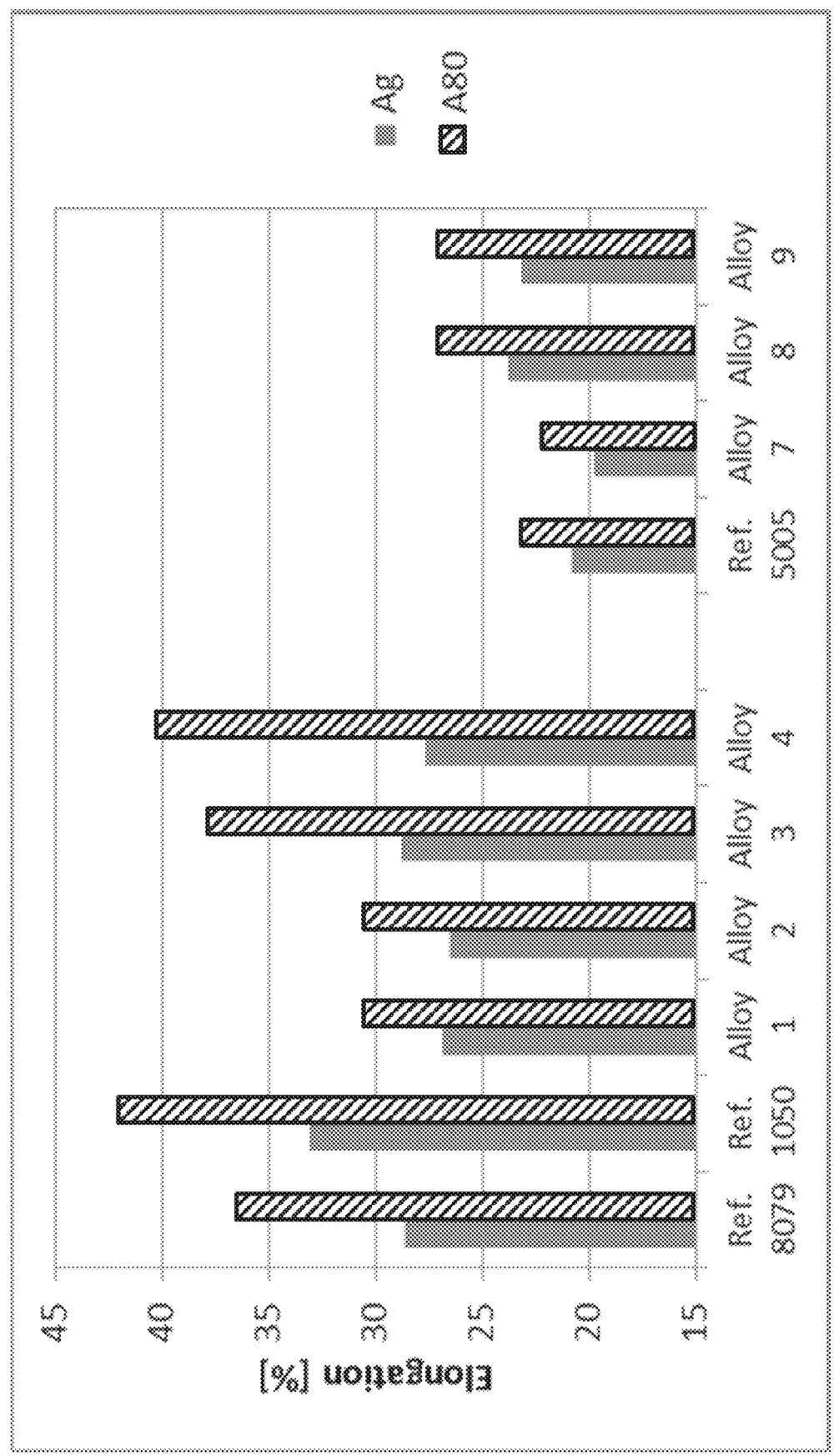
FIG. 1 is a graph showing the percent elongation of comparative alloys and exemplary alloys described herein. The left histogram bar of each pair is the high uniform elongation ($A_g$) and the right histogram bar of each pair represents the elongation at break ($A_{80}$).

Described herein are new multi-layer aluminum alloy sheets which have high forming capabilities, good bake-hardening properties, and exceptional bendability and elongation properties. The alloy sheets and alloys used to prepare the sheets described herein are highly recyclable.

The multi-layer sheets include a core layer of an aluminum containing alloy, having a first side and second side, and at least one cladding layer adjacent to the first side and/or second side of the core layer. The cladding layers exhibit extremely good bending and high elongation and also have a very fine grain size. Surprisingly, the cladding layers as described herein exhibit these properties notwithstanding the Fe content of up to 0.6 wt. % based on the weight of the cladding layer. Typically, to achieve fine grain size in a wrought sheet product prepared from aluminum alloys under standard processing conditions (e.g., casting, homogenizing, hot and cold rolling, and annealing), the aluminum alloys must include 0.7 wt. % or greater Fe.

Definitions and Descriptions

The terms "invention," "the invention," "this invention" and "the present invention" used herein are intended to refer broadly to all of the subject matter of this patent application and the claims below. Statements containing these terms should be understood not to limit the subject matter described herein or to limit the meaning or scope of the patent claims below.

In this description, reference is made to alloys identified by AA numbers and other related designations, such as "series" or "6xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, the meaning of "a," "an," and "the" includes singular and plural references unless the context clearly dictates otherwise.

In the following examples, the aluminum alloys are described in terms of their elemental composition in wt. %. In each alloy, the remainder is aluminum, with a maximum wt. % of 0.15% for the sum of all impurities.

Multi-Layer Metal Sheet

Provided herein is a multi-layer metal sheet. The multi-layer metal sheet includes a core layer of aluminum-containing alloy having a first side and a second side and one or more cladding layer(s). In some examples, the core layer is clad on only one side (i.e., one cladding layer is present in the metal sheet). In other examples, the core layer is clad on both sides (i.e., two cladding layers are present in the metal sheet).

The first side of the core layer is adjacent to and contacts a first cladding layer to form a first interface. In other words, no layers intervene between the first cladding layer and the first side of the core layer. Optionally, the multi-layer metal sheet includes a second cladding layer. In these instances, the second side of the core layer is adjacent to and contacts a second cladding layer to form a second interface (i.e., no layers intervene between the second cladding layer and the second side of the core layer). The first cladding layer and the second cladding layer may be the same chemical composition or different chemical compositions.

Core Layer

The core layer is an aluminum-containing alloy. In some examples, any alloy designated as an "AA6xxx series" alloy, an "AA2xxx series" alloy, an "AA5xxx series" alloy, or an "AA7xxxx series" alloy is suitable for use as the core layer. By way of non-limiting example, the AA6xxx alloys for use as the core layer can include AA6016, AA6016A, AA6013, AA6014, AA6008, AA6005, AA6005A, AA6005B, AA6005C, AA6451, AA6181A, AA6501, AA6056, AA6011 or AA6111 alloys. Non-limiting exemplary AA2xxx series alloys for use as the core layer can include AA2013 or AA2002 alloys. Non-limiting exemplary AA5xxx series alloys for use as the core layer can include AA5182, AA5754, AA5251, AlMg5, or AlMg6 alloys. Non-limiting exemplary AA7xxx series alloys for use as the core layer can include AA7075, AA7085, AA7021, AA7022, AA7049, AA7050, AA7019, AA7001, AA7003, AA7010, or AA7012 alloys.

In some examples, the alloy for use as the core layer can have the following elemental composition as provided in Table 1.

TABLE 1

| Element | Weight Percentage (wt. %) |
|---------|---------------------------|
| Si | 1.0-1.5 |
| Fe | 0.1-0.35 |
| Cu | 0.01-0.20 |
| Mn | 0.01-0.20 |
| Mg | 0.15-0.4 |
| Cr | 0-0.1 |
| Ni | 0-0.05 |
| Zn | 0-0.2 |
| Ti | 0.01-0.05 |
| Co | 0-0.05 |
| Nb | 0-0.05 |
| V | 0-0.05 |
| Zr | 0-0.05 |
| Ta | 0-0.05 |
| Hf | 0-0.05 |
| Impurities | Up to 0.15 |
| Al | Remainder |

In some examples, the alloy for use as the core layer can have the following elemental composition as provided in Table 2.

TABLE 2

| Element | Weight Percentage (wt. %) |
|---------|---------------------------|
| Si | 1.15-1.45 |
| Fe | 0.10-0.30 |
| Cu | 0.03-0.18 |
| Mn | 0.04-0.15 |
| Mg | 0.20-0.35 |
| Cr | 0.005-0.045 |
| Ni | 0-0.034 |
| Zn | 0-0.15 |
| Ti | 0.010-0.040 |
| Co | 0-0.03 |
| Nb | 0-0.03 |
| V | 0-0.045 |
| Zr | 0-0.03 |
| Ta | 0-0.03 |

TABLE 2-continued

| Element | Weight Percentage (wt. %) |
| --- | --- |
| Hf | 0-0.03 |
| Impurities | Up to 0.15 |
| Al | Remainder |

In some examples, the core alloy described herein also includes silicon (Si) in an amount of from 1.0% to 1.5% (e.g., from 1.0 to 1.4% or from 1.15 to 1.45%) based on the total weight of the alloy. For example, the alloy can include 1.0%, 1.01%, 1.02%, 1.03%, 1.04%, 1.05%, 1.06%, 1.07%, 1.08%, 1.09%, 1.10%, 1.11%, 1.12%, 1.13%, 1.14%, 1.15%, 1.16%, 1.17%, 1.18%, 1.19%, 1.20%, 1.21%, 1.22%, 1.23%, 1.24%, 1.25%, 1.26%, 1.27%, 1.28%, 1.29%, 1.30%, 1.31%, 1.32%, 1.33%, 1.34%, 1.35%, 1.36%, 1.37%, 1.38%, 1.39%, 1.40%, 1.41%, 1.42%, 1.43%, 1.44%, 1.45%, 1.46%, 1.47%, 1.48%, 1.49% or 1.50% Si. All expressed in wt. %.

In some examples, the core alloy described herein includes iron (Fe) in an amount of from 0.1% to 0.35% (e.g., from 0.10% to 0.30% or from 0.12% to 0.25%) based on the total weight of the alloy. For example, the alloy can include 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, 0.30%, 0.31%, 0.32%, 0.33%, 0.34% or 0.35% Fe. All expressed in wt. %.

In some examples, the core alloy described herein also includes copper (Cu) in an amount of from 0.01% to 0.20% (e.g., from 0.03% to 0.18% or from 0.05% to 0.16%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19% or 0.20% Cu. All expressed in wt. %.

In some examples, the core alloy described herein includes manganese (Mn) in an amount of from 0.01% to 0.20% (e.g., from 0.02% to 0.15%, from 0.03% to 0.12%, or from 0.04% to 0.15%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19% or 0.20% Mn. All expressed in wt. %.

In some examples, the core alloy described herein includes magnesium (Mg) in an amount of from 0.15% to 0.4% (e.g., from 0.20% to 0.35% or from 0.25% to 0.35%) based on the total weight of the alloy. For example, the alloy can include 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, 0.30%, 0.31%, 0.32%, 0.33%, 0.34%, 0.35%, 0.36%, 0.37%, 0.38%, 0.39% or 0.40% Mg. All expressed in wt. %.

In some examples, the core alloy described herein includes chromium (Cr) in an amount of up to 0.1% (e.g., from 0% to 0.1%, from 0.001% to 0.05%, or from 0.005% to 0.04%) based on the total weight of the alloy. For example, the alloy can include 0.001%, 0.002%, 0.003%, 0.004%, 0.005%, 0.006%, 0.007%, 0.008%, 0.009%, 0.010%, 0.011% 0.012%, 0.013%, 0.014%, 0.015%, 0.016%, 0.017%, 0.018%, 0.019%, 0.020%, 0.03%, 0.04%, 0.05%, 0.06%, 0.07%, 0.08%, 0.09% or 0.1% Cr. In some cases, Cr is not present in the alloy (i.e., 0%). All expressed in wt. %.

In some examples, the core alloy described herein includes nickel (Ni) in an amount of up to 0.05% (e.g., from 0% to 0.045%, from 0.01% to 0.04%, or from 0.015% to 0.034%) based on the total weight of the alloy. For example, the alloy can include 0.010%, 0.011%, 0.012%, 0.013%, 0.014%, 0.015%, 0.016%, 0.017%, 0.018%, 0.019%, 0.020%, 0.021%, 0.022%, 0.023%, 0.024%, 0.025%, 0.026%, 0.027%, 0.028%, 0.029%, 0.030%, 0.031%, 0.032%, 0.033%, 0.034%, 0.035%, 0.036%, 0.037%, 0.038%, 0.039%, 0.040%, 0.041%, 0.042%, 0.043%, 0.044%, 0.045%, 0.046%, 0.047%, 0.048%, 0.049% or 0.050% Ni. In some cases, Ni is not present in the alloy (i.e., 0%). All expressed in wt. %.

In some examples, the core alloy described herein can also include zinc (Zn) in an amount of up to 0.2% (e.g., from 0% to 0.15% or from 0.05% to 0.1%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19% or 0.20% Zn. In some cases, Zn is not present in the alloy (i.e., 0%). All expressed in wt. %.

In some examples, the core alloy described herein includes titanium (Ti) in an amount of from 0.01% to 0.05% (e.g., from 0.010% to 0.035%, from 0.012% to 0.028% or from 0.015% to 0.030%) based on the total weight of the alloy. For example, the alloy can include 0.010%, 0.011%, 0.012%, 0.013%, 0.014%, 0.015%, 0.016%, 0.017%, 0.018%, 0.019%, 0.020%, 0.021%, 0.022%, 0.023%, 0.024%, 0.025%, 0.026%, 0.027%, 0.028%, 0.029%, 0.030%, 0.031%, 0.032%, 0.033%, 0.034%, 0.035%, 0.036%, 0.037%, 0.038%, 0.039%, 0.040%, 0.041%, 0.042%, 0.043%, 0.044%, 0.045%, 0.046%, 0.047%, 0.048%, 0.049% or 0.050% Ti. All expressed in wt. %.

In some examples, the core alloy described herein includes cobalt (Co) in an amount of up to 0.05% (e.g., from 0% to 0.04% or from 0.01% to 0.03%) based on the total weight of the alloy. For example, the alloy can include 0.01%, 0.02%, 0.03%, 0.04%, or 0.05% Co. In some cases, Co is not present in the alloy (i.e., 0%). All expressed in wt. %.

In some examples, the core alloy described herein includes niobium (Nb) in an amount of up to 0.05% (e.g., from 0% to 0.04% or from 0.01% to 0.03%) based on the total weight of the alloy. For example, the alloy can include 0.01%, 0.02%, 0.03%, 0.04%, or 0.05% Nb. In some cases, Nb is not present in the alloy (i.e., 0%). All expressed in wt. %.

In some examples, the core alloy described herein includes vanadium (V) in an amount of up to 0.05% (e.g., from 0% to 0.045% or from 0.01% to 0.03%) based on the total weight of the alloy. For example, the alloy can include 0.010%, 0.011%, 0.012%, 0.013%, 0.014%, 0.015%, 0.016%, 0.017%, 0.018%, 0.019%, 0.020%, 0.021%, 0.022%, 0.023%, 0.024%, 0.025%, 0.026%, 0.027%, 0.028%, 0.029%, 0.030%, 0.031%, 0.032%, 0.033%, 0.034%, 0.035%, 0.036%, 0.037%, 0.038%, 0.039%, 0.040%, 0.041%, 0.042%, 0.043%, 0.044%, 0.045%, 0.046%, 0.047%, 0.048%, 0.049% or 0.050% V. In some cases, V is not present in the alloy (i.e., 0%). All expressed in wt. %.

In some examples, the core alloy described herein includes zirconium (Zr) in an amount of up to 0.05% (e.g., from 0% to 0.04% or from 0.01% to 0.03%) based on the total weight of the alloy. For example, the alloy can include 0.01%, 0.02%, 0.03%, 0.04%, or 0.05% Zr. In some cases, Zr is not present in the alloy (i.e., 0%). All expressed in wt. %.

In some examples, the core alloy described herein includes tantalum (Ta) in an amount of up to 0.05% (e.g., from 0% to 0.04% or from 0.01% to 0.03%) based on the total weight of the alloy. For example, the alloy can include 0.01%, 0.02%, 0.03%, 0.04%, or 0.05% Ta. In some cases, Ta is not present in the alloy (i.e., 0%). All expressed in wt. %.

In some examples, the core alloy described herein includes hafnium (Hf) in an amount of up to 0.05% (e.g., from 0% to 0.04% or from 0.01% to 0.03%) based on the total weight of the alloy. For example, the alloy can include 0.01%, 0.02%, 0.03%, 0.04%, or 0.05% Hf. In some cases, Hf is not present in the alloy (i.e., 0%). All expressed in wt. %.

Optionally, the core alloy compositions described herein can further include other minor elements, sometimes referred to as impurities, in amounts of 0.05% or below, 0.04% or below, 0.03% or below, 0.02% or below, or 0.01% or below. These impurities may include, but are not limited to Zr, Sn, Ga, Ca, Bi, Na, Pb, or combinations thereof. Accordingly, Zr, Sn, Ga, Ca, Bi, Na, or Pb may be present in alloys in amounts of 0.05% or below, 0.04% or below, 0.03% or below, 0.02% or below, or 0.01% or below. The sum of all impurities does not exceed 0.15% (e.g., 0.10%). All expressed in wt. %. The remaining percentage of each alloy is aluminum.

In some examples, the alloy for use as the core layer can have the following elemental composition: 1.15-1.4 wt. % Si, 0.12-0.25 wt. % Fe, 0.05-0.16 wt. % Cu, 0.046-0.13 wt. % Mn, 0.25-0.35 wt. % Mg, 0.016-0.06 wt. % Cr, 0-0.035 wt. % Ni, 0-0.1 wt. % Zn, 0.012-0.028 wt. % Ti, 0-0.03 wt. % Co, 0-0.03 wt. % Nb, 0-0.03 wt. % V, 0-0.03 wt. % Zr, 0-0.03 wt. % Ta, 0-0.03 wt. % Hf, up to 0.15 wt. % impurities and the remainder Al.

The thickness of the core layer can be from about 70% to about 90% of the multi-layer metal sheets described herein. For example, in a multi-layer metal sheet having a thickness of 1000 microns, the core layer can have a thickness of about 700 microns to about 900 microns.

Cladding Layer(s)

As described above, also disclosed is an aluminum-containing alloy for use as the cladding layer(s) in the multi-layer metal sheets. Alloys suitable for use as the cladding layers include alloys containing up to 0.6 wt. % Fe and one or more of the additional elements Mn, Ni, Ti, Co, Nb, Cr, V, Zr, Hf, and Ta. The alloys for use as the cladding layers exhibit extremely good bending and high elongation. These properties of the cladding layers are achieved in part due to the microstructure (e.g., a fine grain size), which is achieved by the specific elemental composition of the clad layer alloy. Specifically, the alloy can have the following elemental composition as provided in Table 3.

TABLE 3

| Element | Weight Percentage (wt. %) |
|---|---|
| Fe | 0.1 to 0.6 |
| Si | up to 0.5 |
| Cu | up to 0.5 |
| Mg | up to 1.5 |
| Cr | up to 0.25 |
| Zn | up to 0.4 |
| Mn | up to 0.3 |
| Ni | up to 0.60 |
| Ti | up to 0.15 |
| Co | up to 0.60 |
| Nb | up to 0.3 |
| V | up to 0.2 |
| Zr | up to 0.25 |
| Hf | up to 0.30 |
| Ta | up to 0.20 |
| Impurities | 0-0.05 (each) |
|  | 0-0.15 (total) |
| Al | Remainder |

In some examples, the alloy can have the following elemental composition as provided in Table 4.

TABLE 4

| Element | Weight Percentage (wt. %) |
|---|---|
| Fe | 0.1 to 0.55 |
| Si | up to 0.5 |
| Cu | up to 0.5 |
| Mg | up to 0.25 |
| Cr | up to 0.10 |
| Zn | up to 0.4 |
| Mn | 0.01 to 0.25 |
| Ni | up to 0.50 |
| Ti | up to 0.15 |
| Co | up to 0.50 |
| Nb | up to 0.3 |
| V | up to 0.2 |
| Zr | up to 0.20 |
| Hf | up to 0.25 |
| Ta | up to 0.15 |
| Impurities | 0-0.05 (each) |
|  | 0-0.15 (total) |
| Al | Remainder |

In some examples, the alloy can have the following elemental composition as provided in Table 5.

TABLE 5

| Element | Weight Percentage (wt. %) |
|---|---|
| Fe | 0.2 to 0.50 |
| Si | up to 0.25 |
| Cu | up to 0.25 |
| Mg | up to 0.1 |
| Cr | up to 0.05 |
| Zn | up to 0.20 |
| Mn | 0.1 to 0.2 |
| Ni | up to 0.40 |
| Ti | up to 0.12 |
| Co | up to 0.40 |
| Nb | up to 0.2 |
| V | up to 0.18 |
| Zr | up to 0.15 |
| Hf | up to 0.20 |
| Ta | up to 0.10 |
| Impurities | 0-0.05 (each) |
|  | 0-0.15 (total) |
| Al | Remainder |

In some examples, the alloy can have the following elemental composition as provided in Table 6.

TABLE 6

| Element | Weight Percentage (wt. %) |
|---|---|
| Fe | 0.1 to 0.55 |
| Si | up to 0.1 |
| Cu | up to 0.05 |
| Mg | 0.3 to 1.25 |
| Cr | up to 0.10 |
| Zn | up to 0.05 |
| Mn | 0.01 to 0.25 |

TABLE 6-continued

| Element | Weight Percentage (wt. %) |
| --- | --- |
| Ni | up to 0.50 |
| Ti | up to 0.15 |
| Co | up to 0.50 |
| Nb | up to 0.3 |
| V | up to 0.2 |
| Zr | up to 0.20 |
| Hf | up to 0.25 |
| Ta | up to 0.15 |
| Impurities | 0-0.05 (each) |
|  | 0-0.15 (total) |
| Al | Remainder |

In some examples, the alloy can have the following elemental composition as provided in Table 7.

TABLE 7

| Element | Weight Percentage (wt. %) |
| --- | --- |
| Fe | 0.2 to 0.50 |
| Si | up to 0.1 |
| Cu | up to 0.05 |
| Mg | 0.4 to 1.0 |
| Cr | up to 0.05 |
| Zn | up to 0.05 |
| Mn | 0.1 to 0.2 |
| Ni | up to 0.40 |
| Ti | up to 0.12 |
| Co | up to 0.40 |
| Nb | up to 0.2 |
| V | up to 0.18 |
| Zr | up to 0.15 |
| Hf | up to 0.20 |
| Ta | up to 0.10 |
| Impurities | 0-0.05 (each) |
|  | 0-0.15 (total) |
| Al | Remainder |

In some examples, the clad alloy described herein includes iron (Fe) in an amount of from 0.1% to 0.6% (e.g., from 0.1% to 0.55%, from 0.2% to 0.6%, from 0.2% to 0.5%, or from 0.3% to 0.4%) based on the total weight of the alloy. For example, the alloy can include 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, 0.30%, 0.31%, 0.32%, 0.33%, 0.34%, 0.35%, 0.36%, 0.37%, 0.38%, 0.39%, 0.40%, 0.41%, 0.42%, 0.43%, 0.44%, 0.45%, 0.46%, 0.47%, 0.48%, 0.49%, 0.50%, 0.51%, 0.52%, 0.53%, 0.54%, 0.55%, 0.56%, 0.57%, 0.58%, 0.59% or 0.60% Fe. All expressed in wt.

In some examples, the clad alloy described herein also includes silicon (Si) in an amount of up to 0.5% (e.g., from 0% to 0.5%, from 0% to 0.4%, from 0.01% to 0.45%, from 0.02% to 0.4%, or from 0.05% to 0.35%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, 0.30%, 0.31%, 0.32%, 0.33%, 0.34%, 0.35%, 0.36%, 0.37%, 0.38%, 0.39%, 0.40%, 0.41%, 0.42%, 0.43%, 0.44%, 0.45%, 0.46%, 0.47%, 0.48%, 0.49% or 0.50% Si. In some cases, Si is not present in the alloy (i.e., 0%). All expressed in wt. %.

In some examples, the clad alloy described herein also includes copper (Cu) in an amount of up to 0.5% (e.g., from 0% to 0.5%, from 0% to 0.4%, from 0.005% to 0.45%, from 0.01% to 0.4%, or from 0.02% to 0.35%) based on the total weight of the alloy. For example, the alloy can include 0.001%, 0.002%, 0.003%, 0.004%, 0.005%, 0.006%, 0.007%, 0.008%, 0.009%, 0.01%, 0.02%, 0.03%, 0.04% or 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, 0.30%, 0.31%, 0.32%, 0.33%, 0.34%, 0.35%, 0.36%, 0.37%, 0.38%, 0.39%, 0.40%, 0.41%, 0.42%, 0.43%, 0.44%, 0.45%, 0.46%, 0.47%, 0.48%, 0.49% or 0.50% Cu. In some cases, Cu is not present in the alloy (i.e., 0%). All expressed in wt. %.

In some examples, the clad alloy described herein includes magnesium (Mg) in an amount of up to 1.5% (e.g., from 0% to 1.25%, from 0.8% to 1.2%, from 0.8% to 1.0%, from 0% to 0.25%, from 0.01% to 0.2%, from 0.015% to 0.45%, or from 0% to 0.1%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, 0.30%, 0.31%, 0.32%, 0.33%, 0.34%, 0.35%, 0.36%, 0.37%, 0.38%, 0.39%, 0.40%, 0.41%, 0.42%, 0.43%, 0.44%, 0.45%, 0.46%, 0.47%, 0.48%, 0.49%, 0.50%, 0.51%, 0.52%, 0.53%, 0.54%, 0.55%, 0.56%, 0.57%, 0.58%, 0.59%, 0.60%, 0.61%, 0.62%, 0.63%, 0.64%, 0.65%, 0.66%, 0.67%, 0.68%, 0.69%, 0.70%, 0.71%, 0.72%, 0.73%, 0.74%, 0.75%, 0.76%, 0.77%, 0.78%, 0.79%, 0.80%, 0.81%, 0.82%, 0.83%, 0.84%, 0.85%, 0.86%, 0.87%, 0.88%, 0.89%, 0.90%, 0.91%, 0.92%, 0.93%, 0.94%, 0.95%, 0.96%, 0.97%, 0.98%, 0.99%, 1.0%, 1.01%, 1.02%, 1.03%, 1.04%, 1.05%, 1.06%, 1.07%, 1.08%, 1.09%, 1.10%, 1.11%, 1.12%, 1.13%, 1.14%, 1.15%, 1.16%, 1.17%, 1.18%, 1.19%, 1.20%, 1.21%, 1.22%, 1.23%, 1.24%, 1.25%, 1.26%, 1.27%, 1.28%, 1.29%, 1.30%, 1.31%, 1.32%, 1.33%, 1.34%, 1.35%, 1.36%, 1.37%, 1.38%, 1.39%, 1.40%, 1.41%, 1.42%, 1.43%, 1.44%, 1.45%, 1.46%, 1.47%, 1.48%, 1.49% or 1.50% Mg. In some cases, Mg is not present in the alloy (i.e., 0%). All expressed in wt. %.

In some examples, the clad alloy described herein can also include zinc (Zn) in an amount of up to 0.4% (e.g., from 0% to 0.4%, from 0% to 0.3%, from 0.005% to 0.35%, from 0.01% to 0.3%, or from 0.03% to 0.3%) based on the total weight of the alloy. For example, the alloy can include 0.001%, 0.002%, 0.003%, 0.004%, 0.005%, 0.006%, 0.007%, 0.008%, 0.009%, 0.01%, 0.02%, 0.03%, 0.04%, or 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, 0.30%, 0.31%, 0.32%, 0.33%, 0.34%, 0.35%, 0.36%, 0.37%, 0.38%, 0.39% or 0.40% Zn. In some cases, Zn is not present in the alloy (i.e., 0%). All expressed in wt. %.

The clad alloy described herein can further include one or more additional intermetallic promoter elements. As used herein, the term "intermetallic promoter element" refers to an element that promotes the formation of intermetallic compounds, such as $Al_aM_b$, $Al_aM_bN_c$, $Al_aM_bN_cO_d$, $Al_aM_bN_cO_dP_e$, or $Al_aFe_bM_c$, $Al_aFe_bM_cN_d$, $Al_aFe_bM_cN_dO_e$, $Al_aFe_bM_cN_dO_eP_f$ or $Al_aSi_bFe_c$, $Al_aSi_bFe_cM_d$, $Al_aSi_b$-$Fe_cM_dN_e$, $Al_aSi_bFe_cM_dN_eO_f$, $Al_aSi_bFe_cM_dN_eO_fP_g$ where M, N, O and P are metallic elements and a, b, c, d, e, f and g are integers, for example in some cases, an integer from 1 to 100. The intermetallic promoter elements (M, N, O, P) can be selected from Si, Mn, Ni, Ti, Co, Nb, Cr, V, Zr, Hf, and Ta. Optionally, the alloy includes one of these additional elements. Optionally, the alloy includes two or more of these additional elements. For example, the alloy can include a combination of Fe, Si and one or more of Mn, Ni, Ti, Co, Nb, Cr, V, Zr, Hf, and Ta (e.g., AlSi$_x$Fe$_y$M$_z$). In a further example, the alloy can include a combination of Mn and one or more of Ni, Ti, Co, Nb, Cr, V, Zr, Hf, and Ta (e.g., AlMn$_x$M$_y$). The intermetallic promoter elements, in combination with Fe, result in an alloy with better bending and elongation properties than, for example, AA6xxx alloys. The combination of the intermetallic promoter elements and Fe also results in an alloy having a smaller grain size than, for example, soft alloys such as AA1050 and AA5005. For example, the intermetallic compounds can be Al$_3$Fe, Al$_4$(FeMn), AlNb$_2$, Al$_9$Co$_2$ or the like.

In some examples, the clad alloy described herein includes manganese (Mn) in an amount of up to 0.3% (e.g., from 0% to 0.25%, from 0% to 0.2%, from 0.01% to 0.2%, from 0.02% to 0.15%, or from 0.1% to 0.2%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24% or 0.25% Mn. In some cases, Mn is not present in the alloy (i.e., 0%). All expressed in wt. %.

In some examples, the clad alloy described herein includes nickel (Ni) in an amount of up to 0.60% (e.g., from 0% to 0.5%, from 0% to 0.4%, 0.01 to 0.55%, from 0.02% to 0.45%, or from 0.05% to 0.4%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, 0.30%, 0.31%, 0.32%, 0.33%, 0.34%, 0.35%, 0.36%, 0.37%, 0.38%, 0.39%, 0.40%, 0.41%, 0.42%, 0.43%, 0.44%, 0.45%, 0.46%, 0.47%, 0.48%, 0.49%, 0.50%, 0.51%, 0.52%, 0.53%, 0.54%, 0.55% 0.56%, 0.57%, 0.58%, 0.59% or 0.60% Ni. In some cases, Ni is not present in the alloy (i.e., 0%). All expressed in wt. %.

In some examples, the clad alloy described herein includes titanium (Ti) in an amount of up to 0.15% (e.g., from 0% to 0.12%, from 0.01% to 0.15%, or from 0.05% to 0.10%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14% or 0.15% Ti. In some cases, Ti is not present in the alloy (i.e., 0%). All expressed in wt. %.

In some examples, the clad alloy described herein includes cobalt (Co) in an amount of up to 0.60% (e.g., from 0% to 0.5%, from 0% to 0.4%, from 0.01% to 0.55%, from 0.05% to 0.45%, or from 0.4% to 0.6%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, 0.30%, 0.31%, 0.32%, 0.33%, 0.34%, 0.35%, 0.36%, 0.37%, 0.38%, 0.39%, 0.40%, 0.41%, 0.42%, 0.43%, 0.44%, 0.45%, 0.46%, 0.47%, 0.48%, 0.49%, 0.50%, 0.51%, 0.52%, 0.53%, 0.54%, 0.55% 0.56%, 0.57%, 0.58%, 0.59% or 0.60% Co. In some cases, Co is not present in the alloy (i.e., 0%). All expressed in wt. %.

In some examples, the clad alloy described herein includes niobium (Nb) in an amount of up to 0.3% (e.g., from 0% to 0.2%, from 0.01% to 0.3%, or from 0.05% to 0.1%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29% or 0.30% Nb. In some cases, Nb is not present in the alloy (i.e., 0%). All expressed in wt. %.

In some examples, the clad alloy described herein includes chromium (Cr) in an amount of up to 0.25% (e.g., from 0% to 0.20%, from 0% to 0.15%, from 0% to 0.10%, from 0% to 0.08%, from 0% to 0.05%, from 0.01% to 0.05%, or from 0.02% to 0.04%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24% or 0.25% Cr. In some cases, Cr is not present in the alloy (i.e., 0%). All expressed in wt. %.

In some examples, the clad alloy described herein includes vanadium (V) in an amount of up to 0.2% (e.g., from 0% to 0.18%, from 0.01% to 0.2%, or from 0.05% to 0.15%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19% or 0.20% V. In some cases, V is not present in the alloy (i.e., 0%). All expressed in wt. %.

In some examples, the clad alloy described herein includes zirconium (Zr) in an amount of up to 0.25% (e.g., from 0% to 0.20%, from 0% to 0.15%, or from 0.01% to 0.10%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24% or 0.25 Zr. In some cases, Zr is not present in the alloy (i.e., 0%). All expressed in wt. %.

In some examples, the clad alloy described herein includes hafnium (Hf) in an amount of up to 0.30% (e.g., from 0% to 0.25% or from 0% to 0.20%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29% or 0.30% Hf. In some cases, Hf is not present in the alloy (i.e., 0%). All expressed in wt. %.

In some examples, the clad alloy described herein includes tantalum (Ta) in an amount of up to 0.20% (e.g., from 0% to 0.15% or from 0% to 0.10%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19% or 0.20% Ta. In some cases, Ta is not present in the alloy (i.e., 0%). All expressed in wt. %.

Optionally, the clad alloy compositions described herein can further include other minor elements, sometimes referred to as impurities, in amounts of 0.05% or below, 0.04% or below, 0.03% or below, 0.02% or below, or 0.01% or below. These impurities may include, but are not limited to Zr, Sn, Ga, Ca, Bi, Na, Pb, or combinations thereof. Accordingly, Zr, Sn, Ga, Ca, Bi, Na, or Pb may be present in alloys in amounts of 0.05% or below, 0.04% or below, 0.03% or below, 0.02% or below or 0.01% or below. In some cases, the sum of all impurities does not exceed 0.15% (e.g., 0.10%). All expressed in wt. %. The remaining percentage of the alloy is aluminum.

Optionally, the combined amounts of Fe, Mn, Cr, Ti, Co, Ni, and V present in the clad alloy can range from 0.60% to 0.90% (e.g., from 0.65% to 0.85% or from 0.70% to 0.80%). For example, the combined amounts of Fe, Mn, Cr, Ti, Co, Ni, and V can be about 0.60%, 0.61%, 0.62%, 0.63%, 0.64%, 0.65%, 0.66%, 0.67%, 0.68%, 0.69%, 0.70%, 0.71%, 0.72%, 0.73%, 0.74%, 0.75%, 0.76%, 0.77%, 0.78%, 0.79%, 0.80%, 0.81%, 0.82%, 0.83%, 0.84%, 0.85%, 0.86%, 0.87%, 0.88%, 0.89% or 0.90%.

In some examples, the clad alloy can have the following elemental composition: 0-0.1% Si, 0.35-0.45% Fe, 0-0.05% Cu, 0.11-0.17% Mn, 0-0.1% Mg, 0-0.05% Cr, 0-0.05% Ni, 0-0.05 Zn, 0.10-0.12% Ti, 0-0.03% Co, 0-0.03% Nb, 0-0.03% V, 0-0.03% Zr, 0-0.03% Ta, 0-0.03% Hf, up to 0.15% impurities and the remainder Al.

In some examples, the clad alloy can have the following elemental composition: 0-0.1% Si, 0.35-0.45% Fe, 0-0.05% Cu, 0.11-0.17% Mn, 0-0.1% Mg, 0-0.05% Cr, 0-0.05% Ni, 0-0.05% Zn, 0.10-0.12% Ti, 0-0.03% Co, 0-0.03% Nb, 0.12-0.18% V, 0-0.03% Zr, 0-0.03% Ta, 0-0.03% Hf, up to 0.15% impurities and the remainder Al.

In some examples, the clad alloy can have the following elemental composition: 0-0.1% Si, 0.2-0.3% Fe, 0-0.05% Cu, 0.11-0.17% Mn, 0-0.1% Mg, 0-0.05% Cr, 0.2-0.3% Ni, 0-0.05 Zn, 0-0.05 Ti, 0-0.03% Co, 0-0.03% Nb, 0-0.03% V, 0-0.03% Zr, 0-0.03% Ta, 0-0.03% Hf, up to 0.15% impurities and the remainder Al.

In some examples, the clad alloy can have the following elemental composition: 0-0.1% Si, 0.35-0.45% Fe, 0-0.05% Cu, 0.11-0.17% Mn, 0-0.1% Mg, 0-0.05% Cr, 0.2-0.3% Ni, 0-0.05 Zn, 0-0.05 Ti, 0-0.03% Co, 0.05-0.2 Nb, 0-0.03% V, 0-0.03% Zr, 0-0.03% Ta, 0-0.03% Hf, up to 0.15% impurities and the remainder Al.

In some examples, the clad alloy can have the following elemental composition: 0-0.1% Si, 0.2-0.3% Fe, 0-0.05% Cu, 0.11-0.17% Mn, 0-0.1% Mg, 0-0.05% Cr, 0.2-0.3% Ni, 0-0.05 Zn, 0-0.05 Ti, 0.2-0.3% Co, 0-0.03% Nb, 0-0.03% V, 0-0.03% Zr, 0-0.03% Ta, 0-0.03% Hf, up to 0.15% impurities and the remainder Al.

In some examples, the clad alloy can have the following elemental composition: 0-0.1% Si, 0.2-0.3% Fe, 0-0.05% Cu, 0.11-0.17% Mn, 0-0.1% Mg, 0-0.05% Cr, 0.4-0.6% Ni, 0-0.05 Zn, 0-0.05 Ti, 0-0.03% Co, 0-0.03% Nb, 0-0.03% V, 0-0.03% Zr, 0-0.03% Ta, 0-0.03% Hf, up to 0.15% impurities and the remainder Al.

In some examples, the clad alloy can have the following elemental composition: 0-0.1% Si, 0.2-0.3% Fe, 0-0.05% Cu, 0.11-0.17% Mn, 0-0.1% Mg, 0-0.05% Cr, 0-0.03% Ni, 0-0.05 Zn, 0-0.05 Ti, 0.4-0.6% Co, 0-0.03% Nb, 0-0.03% V, 0-0.03% Zr, 0-0.03% Ta, 0-0.03% Hf, up to 0.15% impurities and the remainder Al.

In some examples, the clad alloy can have the following elemental composition: 0-0.1% Si, 0.15-0.25% Fe, 0-0.05% Cu, 0.11-0.17% Mn, 0-0.1% Mg, 0-0.05% Cr, 0-0.05% Ni, 0-0.05 Zn, 0-0.05 Ti, 0.2-0.3% Co, 0-0.03% Nb, 0-0.03% V, 0-0.03% Zr, 0-0.03% Ta, 0-0.03% Hf, up to 0.15% impurities and the remainder Al.

In some examples, the clad alloy can have the following elemental composition: 0-0.1% Si, 0.4-0.55% Fe, 0-0.05% Cu, 0.11-0.17% Mn, 0-0.1% Mg, 0-0.05% Cr, 0.1-0.2% Ni, 0-0.05 Zn, 0-0.05 Ti, 0.1-0.2% Co, 0-0.03% Nb, 0-0.03% V, 0-0.03% Zr, 0-0.03% Ta, 0-0.03% Hf, up to 0.15% impurities and the remainder Al.

In some examples, the clad alloy can have the following elemental composition: 0-0.1% Si, 0.4-0.55% Fe, 0-0.05% Cu, 0.11-0.17% Mn, 0-0.1% Mg, 0-0.05% Cr, 0-0.05 Ni, 0-0.05 Zn, 0-0.05 Ti, 0.2-0.3% Co, 0-0.03% Nb, 0-0.03% V, 0-0.03% Zr, 0-0.03% Ta, 0-0.03% Hf, up to 0.15% impurities and the remainder Al.

In some examples, the clad alloy can have the following elemental composition: 0-0.1% Si, 0.4-0.55% Fe, 0-0.05% Cu, 0.11-0.17% Mn, 0-0.1% Mg, 0-0.05% Cr, 0.2-0.3% Ni, 0-0.05 Zn, 0-0.05 Ti, 0-0.05% Co, 0-0.03% Nb, 0-0.03% V, 0-0.03% Zr, 0-0.03% Ta, 0-0.03% Hf, up to 0.15% impurities and the remainder Al.

In some examples, the clad alloy can have the following elemental composition: 0-0.1% Si, 0.4-0.55% Fe, 0-0.05% Cu, 0.11-0.17% Mn, 0-0.1% Mg, 0-0.05% Cr, 0.05-0.15% Ni, 0-0.05 Zn, 0-0.05 Ti, 0-0.05% Co, 0-0.03% Nb, 0-0.03% V, 0-0.03% Zr, 0-0.03% Ta, 0-0.03% Hf, up to 0.15% impurities and the remainder Al.

In some examples, the clad alloy can have the following elemental composition: 0-0.1% Si, 0.4-0.55% Fe, 0-0.05% Cu, 0.11-0.17% Mn, 0-0.1% Mg, 0-0.05% Cr, 0-0.15 Ni, 0-0.05 Zn, 0-0.05 Ti, 0-0.05% Co, 0-0.03% Nb, 0-0.03% V, 0.2-0.3% Zr, 0-0.03% Ta, 0-0.03% Hf, up to 0.15% impurities and the remainder Al.

In some examples, the clad alloy can have the following elemental composition: 0-0.1% Si, 0.35-0.45% Fe, 0-0.05% Cu, 0.15-0.25% Mn, 0-0.1% Mg, 0-0.05% Cr, 0-0.05% Ni, 0-0.05% Zn, 0.1-0.12% Ti, 0-0.03% Co, 0-0.03% Nb, 0-0.03% V, 0-0.03% Zr, 0-0.03% Ta, 0-0.03% Hf, up to 0.15% impurities and the remainder Al.

In some examples, the clad alloy can have the following elemental composition: 0-0.1% Si, 0.4-0.55% Fe, 0-0.05% Cu, 0.11-0.17% Mn, 0-0.1% Mg, 0-0.05% Cr, 0-0.05% Ni, 0-0.05% Zn, 0.1-0.15% Ti, 0-0.03% Co, 0-0.03% Nb, 0.02-0.1% V, 0-0.03% Zr, 0-0.03% Ta, 0-0.03% Hf, up to 0.15% impurities and the remainder Al.

In some examples, the clad alloy can have the following elemental composition: 0-0.1% Si, 0.4-0.55% Fe, 0-0.05% Cu, 0.11-0.17% Mn, 0-0.1% Mg, 0-0.05% Cr, 0-0.05% Ni, 0-0.05% Zn, 0.02-0.08% Ti, 0-0.03% Co, 0-0.03% Nb, 0.12-0.18% V, 0-0.03% Zr, 0-0.03% Ta, 0-0.03% Hf, up to 0.15% impurities and the remainder Al.

In some examples, the clad alloy can have the following elemental composition: 0-0.1% Si, 0.4-0.55% Fe, 0-0.05% Cu, 0.11-0.17% Mn, 0-0.1% Mg, 0-0.05% Cr, 0-0.05% Ni, 0-0.05% Zn, 0.1-0.15% Ti, 0-0.03% Co, 0-0.03% Nb, 0-0.05% V, 0-0.03% Zr, 0.05-0.15% Ta, 0-0.03% Hf, up to 0.15% impurities and the remainder Al.

In some examples, the clad alloy can have the following elemental composition: 0-0.1% Si, 0.4-0.55% Fe, 0-0.05% Cu, 0.11-0.17% Mn, 0-0.1% Mg, 0-0.05% Cr, 0-0.05% Ni, 0-0.05% Zn, 0.1-0.15% Ti, 0-0.03% Co, 0-0.03% Nb, 0-0.05% V, 0-0.03% Zr, 0-0.03% Ta, 0.15-0.25% Hf, up to 0.15% impurities and the remainder Al.

As described above, the multi-layer metal sheets can contain one cladding layer or more than one cladding layer. In some cases, the multi-layer metal sheets contain only a first cladding layer. In some cases, the multi-layer metal sheets contain a first cladding layer and a second cladding layer. In some cases, the first cladding layer and the second cladding layer are identical in composition. In other cases, the first cladding layer and the second cladding layer differ in composition.

The thickness of each of the first cladding layer and the second cladding layer can be from about 2.5% to about 20% of the total sheet thickness. For example, the first and second cladding layers can each be about 20%, 19.5%, 19%, 18.5%, 18%, 17.5%, 17%, 16.5%, 16%, 15.5%, 15%, 14.5%, 14%, 13.5%, 13%, 12.5%, 12%, 11.5%, 11%, 10.5%, 10%, 9.5%, 9%, 8.5%, 8%, 7.5%, 7%, 6.5%, 6%, 5.5%, 5%, 4.5%, 4%, 3.5%, 3%, or 2.5% of the total sheet thickness. The first cladding layer and the second cladding layer may have the same thickness as one another, although they need not.

Methods of Making

The multi-layer metal sheets as described herein include a core layer, a first cladding layer, and optionally a second cladding layer and can be made using any conventional method known to those of skill in the art. A clad layer as described herein can be attached to a core layer as described herein by any means known to persons of ordinary skill in the art. For example, a clad layer can be attached to a core layer by direct chill co-casting as described in, for example, U.S. Pat. Nos. 7,748,434 and 8,927,113, both of which are hereby incorporated by reference in their entireties; by hot and cold rolling a composite cast ingot as described in U.S. Pat. No. 7,472,740, which is hereby incorporated by reference in its entirety; or by roll bonding to achieve the required metallurgical bonding between the core and the cladding. Optionally, the multi-layer metal sheet can be made by hot metal rolling or the like to bond the cladding and the core.

Optionally, the alloys described herein for use as the core and cladding layers can be cast using any suitable casting method known to those of skill in the art. As a few non-limiting examples, the casting process can include a Direct Chill (DC) casting process and a Continuous Casting (CC) process. The casting process can be performed according to standards commonly used in the aluminum industry as known to one of ordinary skill in the art. The CC process may include, but is not limited to, the use of twin belt casters, twin roll casters, or block casters.

In some examples, the casting process is performed by a DC casting process to form a cast ingot. The cast ingot can then be subjected to further processing steps. In some examples, the processing steps include subjecting the metal ingot to a homogenization step, a hot rolling step, a cold rolling step, and/or an annealing step, as known to those of ordinary skill in the art.

In the homogenization step, an ingot prepared from the alloy compositions described herein is heated to a temperature ranging from about 500° C. to about 580° C. The ingot is then allowed to soak (i.e., held at the indicated temperature) for a period of time. In some examples, the ingot is allowed to soak for up to 48 hours.

Following the homogenization step, a hot rolling step can be performed. Prior to the start of hot rolling, the homogenized ingot can be allowed to cool to approximately 480° C. The ingots can then be hot rolled to a 4 mm to 16 mm thick gauge. The hot rolling temperature can range from approximately 200° C.-450° C.

Optionally, a cold rolling step can then be performed to result in an intermediate gauge. The rolled gauge can then undergo an annealing process at a temperature of from about 250° C. to about 450° C., with a soak time of approximately 2 hours and controlled cooling to room temperature (e.g., about 20° C. to about 25° C., including 20° C., 21° C., 22° C., 23° C., 24° C., or 25° C.) at a rate of about 5° C./hour to 200° C./hour. Following the annealing process, the rolled gauge can be cold rolled to a final gauge thickness of from about 0.7 mm to 2.2 mm. The cold rolling can be performed to result in a final gauge thickness that represents an overall gauge reduction from 20% to 95%. Subsequently, the multi-layer package can undergo a solution heat treatment step at a temperature of from about 500° C. to 580° C., with air or water quenching.

After the solution heat treatment step, the multi-layer package can optionally undergo a pre-aging treatment by heating to a temperature of from about 40° C. to 140° C. for a period of time from about 30 minutes to 8 hours. For example, the pre-aging treatment can be performed at a temperature of 40° C., 50° C., 60° C., 70° C., 80° C., 90° C., 100° C., 110° C., 120° C., 130° C., or 140° C. Optionally, the pre-aging treatment can be performed for 30 minutes, 1 hour, 2 hours, 3 hours, 4 hours, 5 hours, 6 hours, 7 hours, or 8 hours.

Properties of Alloys and Multi-Layer Metal Sheets

The alloys and multi-layer metal sheets as described herein have high forming capabilities and display exceptional bendability and elongation. The alloys display an elongation at break ($A_{80}$) of at least 20% (e.g., at least 25%, at least 30%, or at least 35%) and a uniform elongation ($A_g$) of at least 18% (e.g., at least 20% or at least 27%). The alloys and sheets are also highly recyclable.

The alloys described herein, particularly the alloys for use as the cladding layers, can achieve very low bend angles. For example, the alloys described herein can achieve bend angles of lower than 9° after being subjected to uniaxial pre-straining at 15% at 90° to the rolling direction and/or ageing at 180° C. for up to 10 hours according to methods known to those of ordinary skill in the art.

The alloys described herein, particularly the alloys for use as the cladding layers, can be used to produce a sheet having a fine grain size. As used herein, a fine grain size refers to a grain size within the range of approximately 10 microns to approximately 30 microns.

In some examples, alloys for use as the cladding layers simultaneously display a fine grain size along with a high elongation at break ($A_{80}$) in directions longitudinal, transverse, and diagonal to the rolling direction. In these examples, the combined content of Fe, Mn, Cr, Ti, Co, Ni, and/or V present in the alloy can range from 0.60 wt. % to 0.90 wt. % (e.g., from 0.65 wt. % to 0.85 wt. % or from 0.70 wt. % to 0.80 wt. %).

Methods of Using

The aluminum alloys and multi-layer metal sheets described herein can be used in transportation applications, including automotive, aircraft, and railway applications. In some cases, the alloys and sheets can be used to prepare motor vehicle body part products, such as a body side panel, a door outer panel, a trunk lid outer panel, or an outer hood. The multi-layer metal sheet can also be used to produce deep drawing door inner panels, complicated trunk lid inner panels, as well as highly deformed structural inner panels and tunnels. The aluminum alloys and multi-layer metal sheets described herein can also be used in aircraft or railway vehicle applications, to prepare, for example, external (e.g., outer skin panels) and internal panels.

The following examples will serve to further illustrate the present invention without, at the same time, however, constituting any limitation thereof. On the contrary, resort may be had to various embodiments, modifications and equivalents thereof which, after reading the description herein, may suggest themselves to those skilled in the art without departing from the spirit of the invention. During the studies described in the following examples, conventional procedures were followed, unless otherwise stated. Some of the procedures are described below for illustrative purposes.

Example 1

Alloys for use as the cladding layers as described herein were prepared by mold casting the alloys into ingots, homogenizing the ingots at 540° C. for 10 hours, hot rolling the homogenized ingots at 340° C.-370° C., and then allowing the hot rolled sheets to cool to room temperature.

Subsequently, the sheets were cold rolled to 1 mm and annealed at a peak metal temperature of 540° C. for 70 seconds.

The elemental composition ranges for the prepared alloys are shown in Table 8. Comparative Alloy 1 is an AA8079 alloy that primarily contains aluminum and iron. Comparative Alloy 2 is an AA1050 alloy. Comparative Alloy 3 is an AA5005 alloy. Alloys 1, 2, 3, 4, 5, 6, 7, 8, and 9 are exemplary alloys described herein.

TABLE 8

| Alloy | Si | Fe | Mn | Mg | Ni | Ti | Co | V | Nb |
|---|---|---|---|---|---|---|---|---|---|
| Comparative Alloy 1 "Ref. AA8079" | 0.04 | 1.1 | — | — | — | — | — | — | — |
| Comparative Alloy 2 "Ref. AA1050" | 0.03 | 0.1 | — | — | — | — | — | — | — |
| Alloy 1 | 0.08 | 0.24 | 0.14 | — | 0.23 | — | — | — | — |
| Alloy 2 | 0.09 | 0.22 | 0.13 | — | 0.22 | — | 0.23 | — | — |
| Alloy 3 | 0.07 | 0.42 | 0.14 | — | 0.22 | — | — | — | 0.07 |
| Alloy 4 | 0.09 | 0.44 | 0.14 | — | — | 0.11 | — | 0.15 | — |
| Alloy 5 | 0.06 | 0.14 | — | — | 0.54 | — | — | — | — |
| Alloy 6 | 0.07 | 0.14 | — | — | — | — | 0.56 | — | — |
| Comparative Alloy 3 "Ref. AA5005" | 0.10 | 0.30 | 0.08 | 1.0 | — | — | — | — | — |
| Alloy 7 | 0.09 | 0.21 | 0.16 | 0.51 | — | — | — | — | — |
| Alloy 8 | 0.09 | 0.21 | 0.15 | 0.51 | — | 0.10 | — | — | — |
| Alloy 9 | 0.09 | 0.45 | 0.14 | 0.50 | — | 0.10 | — | — | — |

All expressed in wt. %. Up to 0.15 wt. % impurities. Remainder is Al.

Elongation and Bending

Figure 14:
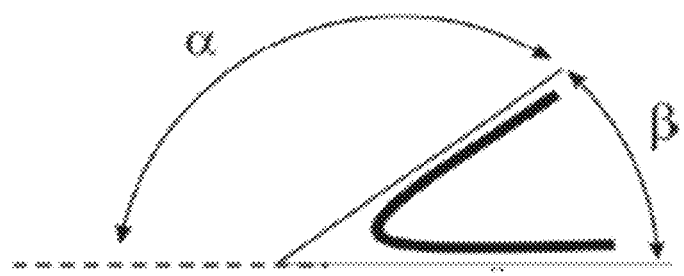
FIG. 14 is an illustration depicting the meaning of inner bending angle ($\beta$).

The elongation and bending properties of the exemplary and comparative alloys were measured. The elongation was measured according to method DIN EN ISO 6892-1:2009, at 90° to the rolling direction. The inner bend angle (β) was measured after uniaxially pre-straining the sample 10% or 15% transverse to the rolling direction or after artificial aging at 180° C. for 10 hours. An illustration depicting the meaning of inner bending angle (β) is provided in FIG. 14. The bend test was performed according to the DIN EN ISO 7438 method; the bending line was parallel to the rolling direction, the distance between the two rolls prior to bending was two times the bending metal thickness, and the punch radius was 0.2 mm with a punch angle of 3°.

As shown in FIG. 1, Alloys 1, 2, 3, 4 and 7 displayed relatively high uniform elongation ($A_g$) and elongation at break ($A_{80}$) percentages. Alloys 8 and 9, containing Ti and Mn, showed improved $A_g$ and Ago values over the AA5005 alloy represented as Comparative Alloy 3, which does not include Ti or Mn. Comparative Alloy 3 also includes more Mg than Alloys 8 and 9.

Figure 2:
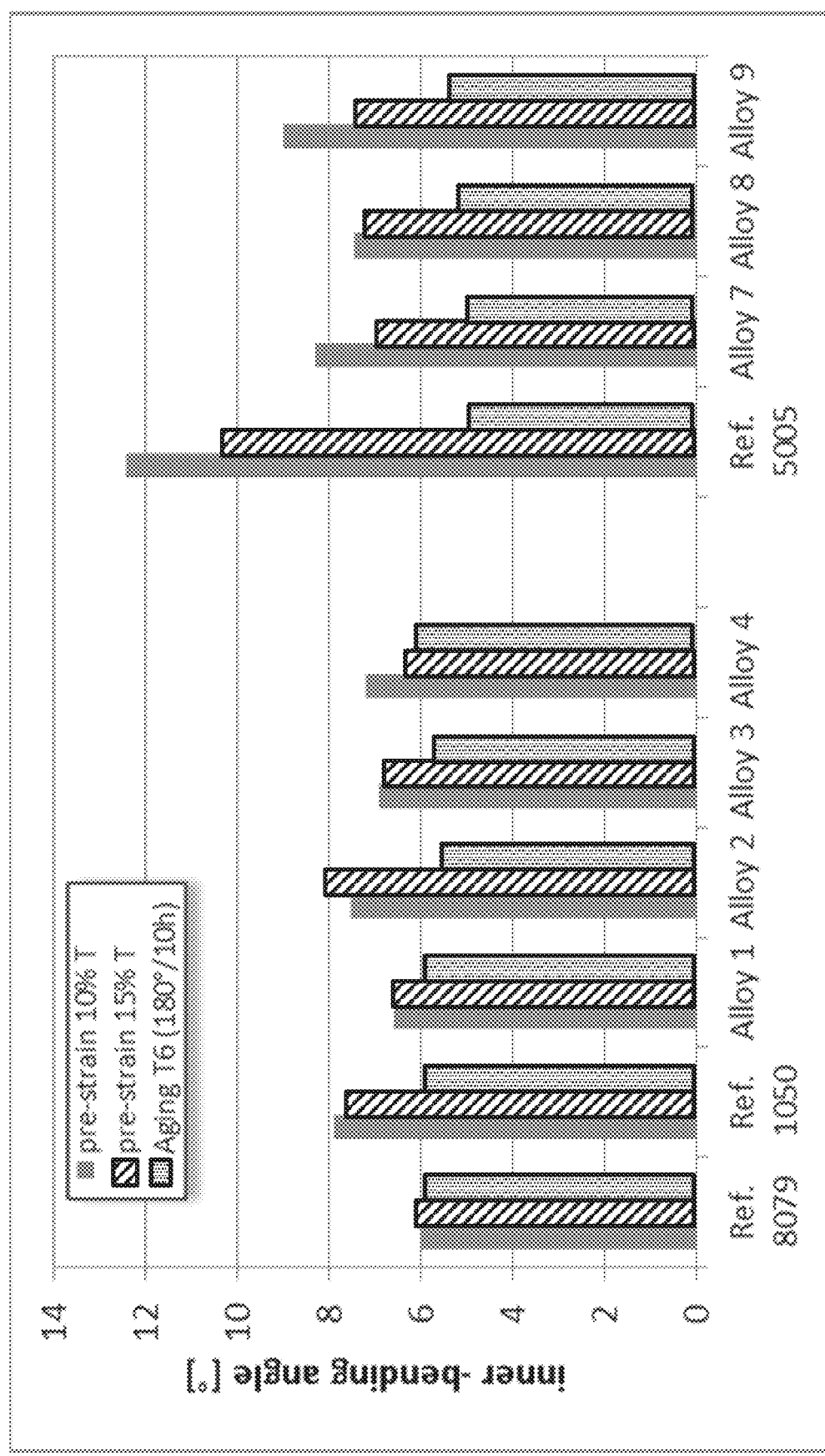
FIG. 2 is a graph showing the inner angles after a bending test for the comparative alloys and exemplary alloys described herein. The left histogram bar of each set represents the bending angles after the alloys were subjected to a 10% elongation ("pre-strain 10% T"). The middle histogram bar of each set represents the bending angles after the alloys were subjected to a 15% elongation ("pre-strain 15% T"). The right histogram bar of each set represents the bending angles after the alloys were subjected to heat treatment at 180° C. for 10 hours ("Aging T6 (180°/10 h)").

All of the exemplary alloys showed very good bending properties in comparison to the comparative alloys. FIG. 2 shows the bending angles after the alloys were subjected to a 15% elongation ("pre-strain 15% T" in FIG. 2), a 10% elongation ("pre-strain 10% T" in FIG. 2), and after heat treatment at 180° C. for 10 hours ("Aging T6 (180°/10 h)" in FIG. 2).

Figure 3:
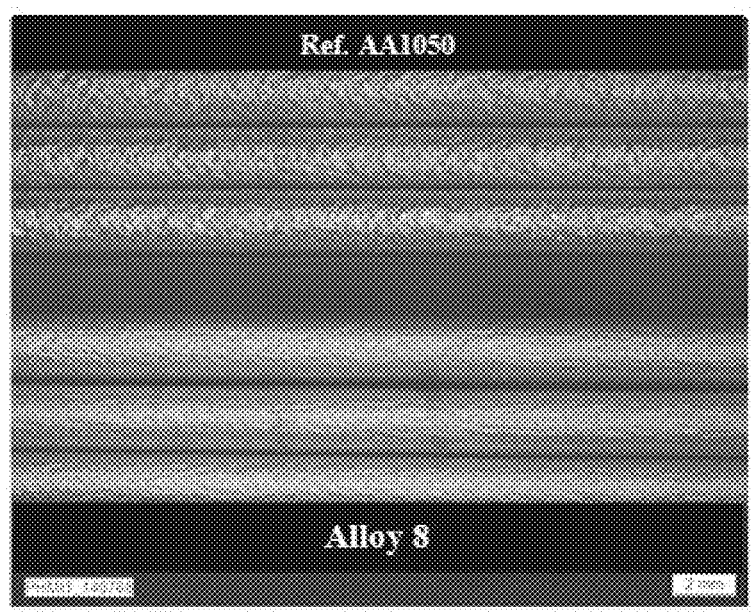
FIG. 3 is a picture of a comparative alloy and of an exemplary alloy described herein, depicting the extent of the orange peel effect.

The alloys were also tested to determine the extent of forming deformations, such as orange peel defects. As shown in FIG. 3, Alloy 8 displayed no orange peel effects, whereas Comparative Alloy 2 exhibited severe orange peel defects.

Grain Structure

Figure 4:
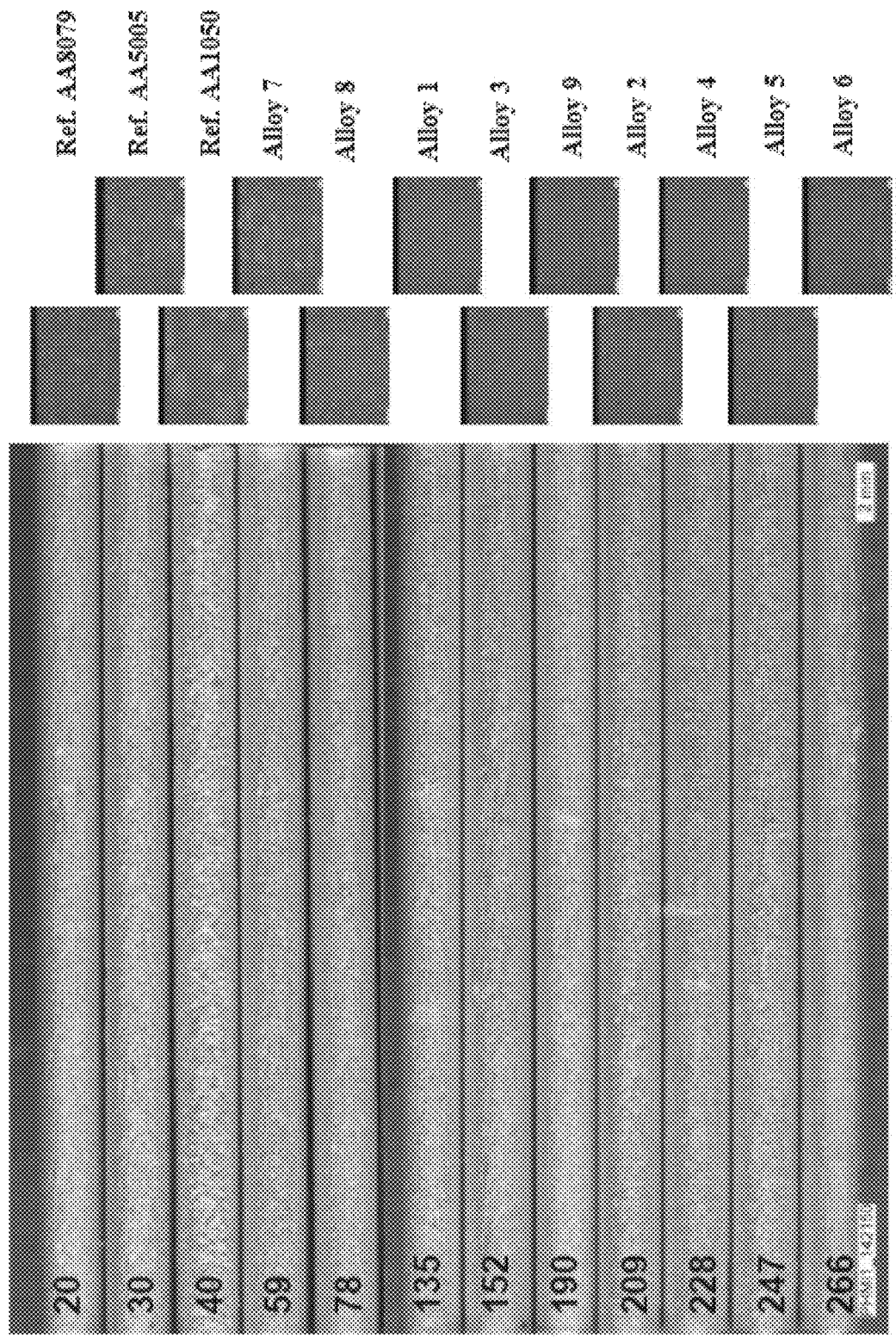
FIG. 4 contains pictures of alloys and their respective grain structure images for comparative alloys and exemplary alloys described herein.
Figure 5:
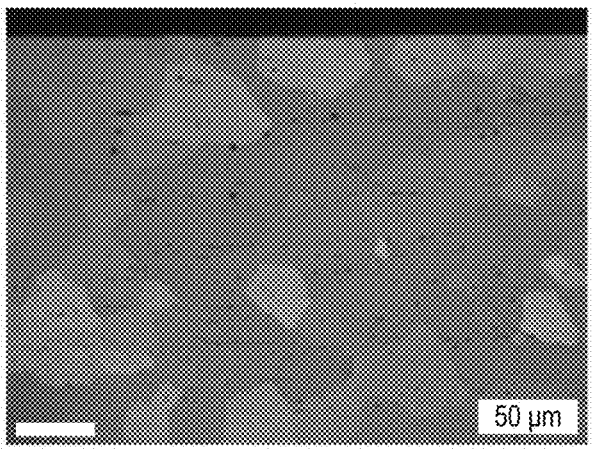
FIG. 5 shows grain structure images for comparative alloys and exemplary alloys described herein.
Figure 5:
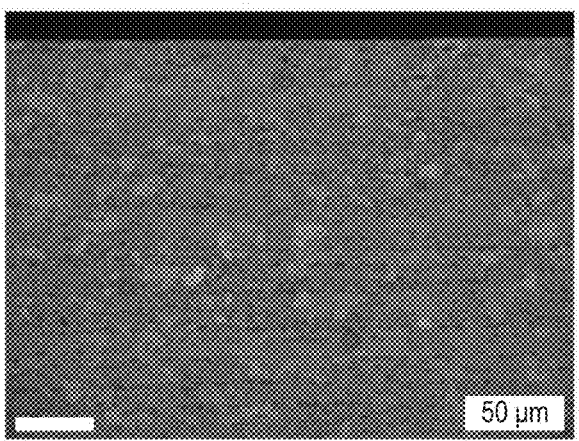
Figure 5:
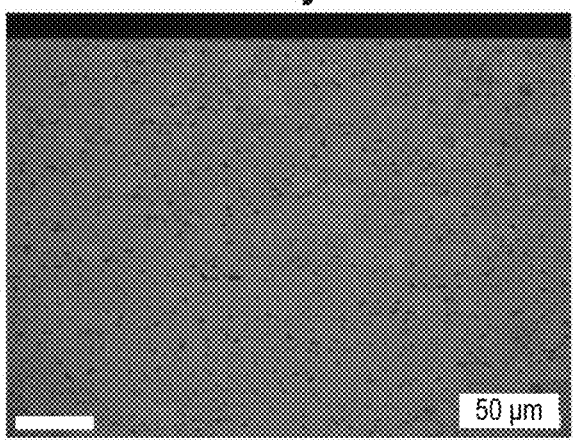
Figure 5:
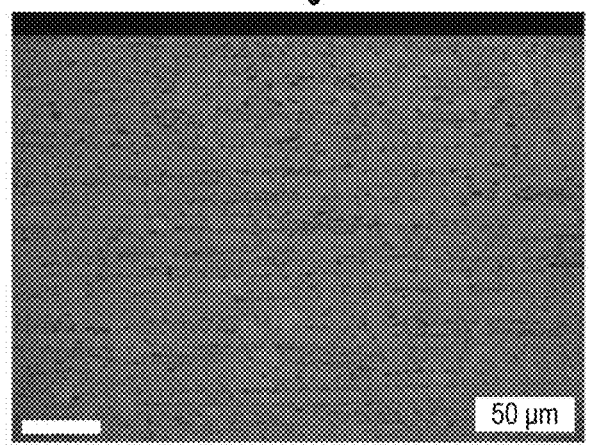
Figure 5:
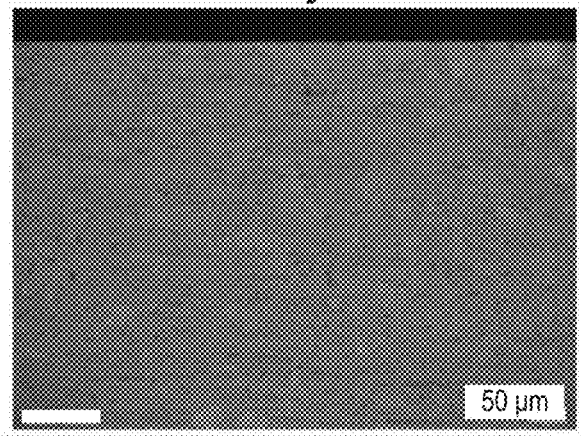
Figure 5:
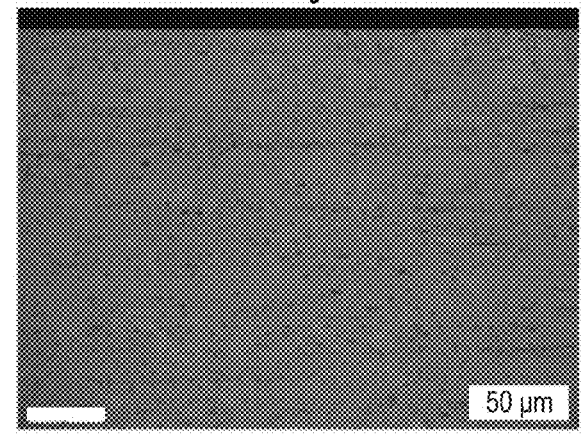
Figure 6:
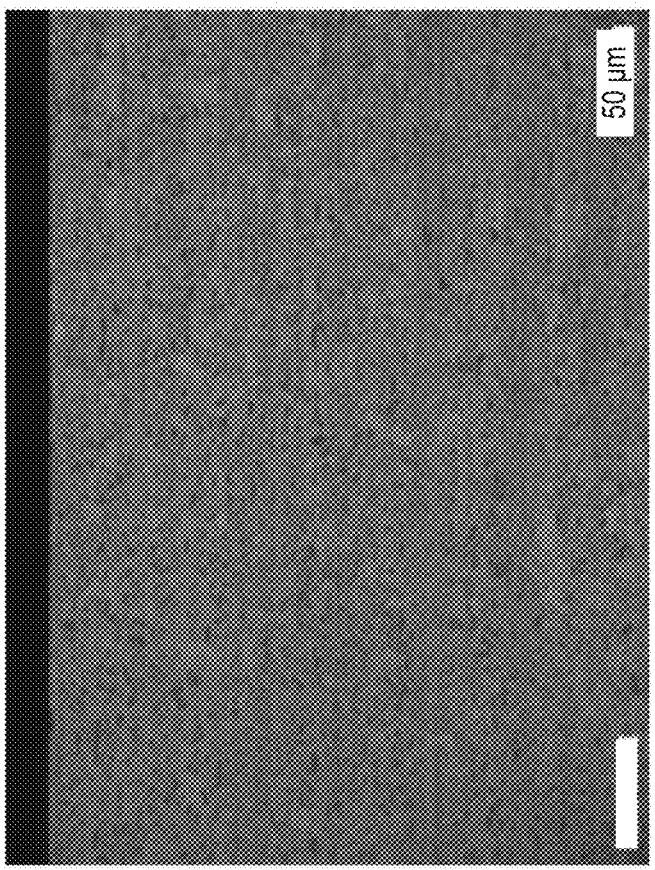
FIG. 6 shows grain structure images for exemplary alloys described herein.
Figure 6:
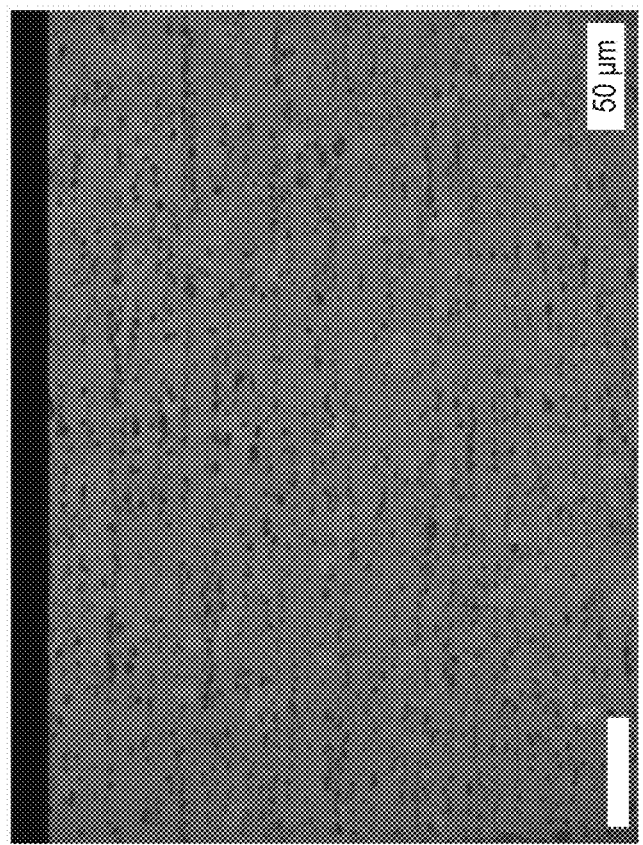

The grain structures for the comparative alloys and the exemplary alloys described herein were analyzed by optical microscopy using an electron back-scattered diffraction technique in a scanning electron microscope (SEM-EBSD). For the optical microscopy method, the samples were prepared following standard metallographic procedures as known to those of ordinary skill in the art. The samples were anodized using Barker's reagent at a voltage of 30V for 2 minutes. To prepare a 1000 mL solution of Barker's reagent, 60 mL of tetrafluoroboric acid solution (32%) was mixed with 940 mL of water. The grain structure was observed under polarized light using a Leica DM6000 microscope (Leica Microsystems Inc.; Buffalo Grove, IL). FIG. 4 contains pictures of alloys and their respective grain structure images for the comparative alloys and the exemplary alloys. FIGS. 5 and 6 show that increasing the weight percentages of Fe, Ni, Co, and Nb reduces grain size. Also, Alloy 4 (see FIG. 5), containing 0.4% Fe, 0.1% Ti, 0.1% V, and 0.1% Mn, exhibits fine grain size. FIG. 6 shows that Alloy 6, which includes Co, and Alloy 5, which includes Ni, both have a very fine grain size. Both Alloys 4 and 5 have a very low Fe content.

Figure 7:
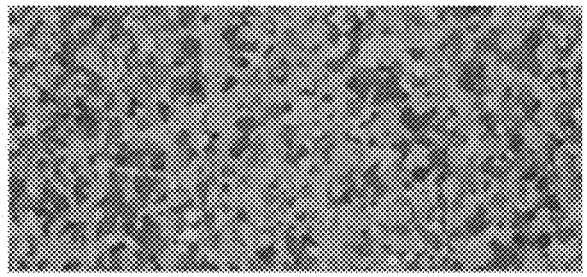
FIG. 7 shows electron backscatter diffraction images for comparative alloys and exemplary alloys described herein.
Figure 7:
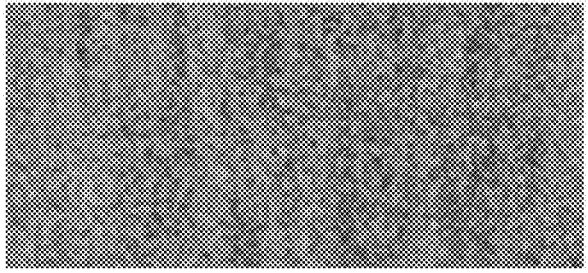
Figure 7:
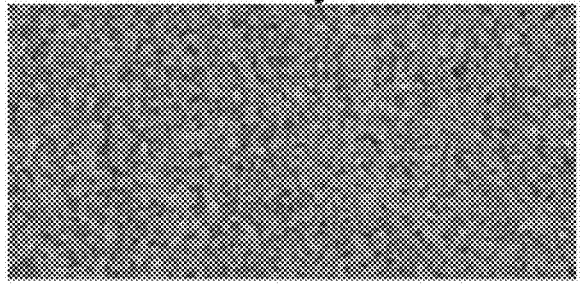
Figure 7:
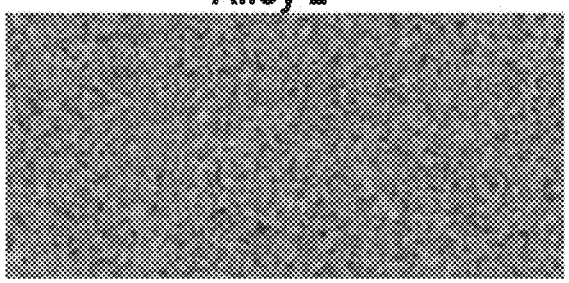
Figure 7:
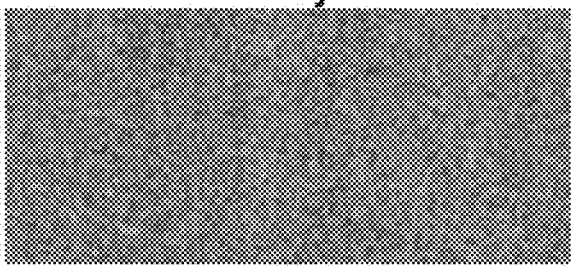
Figure 7:
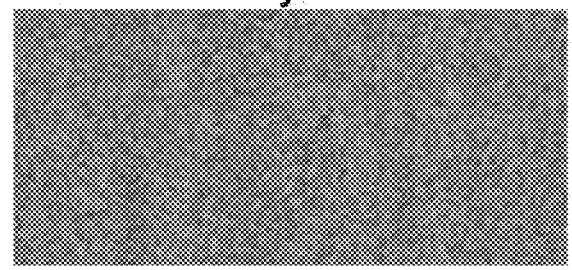

Electron backscatter diffraction (EBSD) was performed in a field emission scanning electron microscope (Zeiss SUPRA-40; Carl Zeiss Microscopy GmbH; Jena, Germany) and analyzed using an Oxford—Channel 5 data analyzer. A threshold level for grain boundaries was set as 10° of misorientation. The pictures obtained from the EBSD are shown in FIG. 7 for Comparative Alloy 2 (labeled as "Ref AA1050"), Comparative Alloy 1 (labeled as "Ref. AA8079"), Alloy 6, Alloy 2, Alloy 3, and Alloy 4. The grain size was measured for the alloys with EBSD and the data are provided in Table 9, where Dx is the average grain diameter parallel to the x-axis and Dy is the average grain diameter parallel to the y-axis.

TABLE 9

| Alloy | Dx (μm) | Dy (μm) |
|---|---|---|
| Comp. 2 ("Ref. AA1050") | 48 | 47 |
| Comp. 1 ("Ref. AA8079") | 18 | 18 |
| 2 | 22 | 21 |
| 3 | 20 | 19 |
| 4 | 16 | 17 |
| 6 | 20 | 19 |

The effect of texture on the alloy types was analyzed. There was no significant effect on the properties of the alloys, such as elongation and bending, resulting from the variations in texture.

Figure 8:
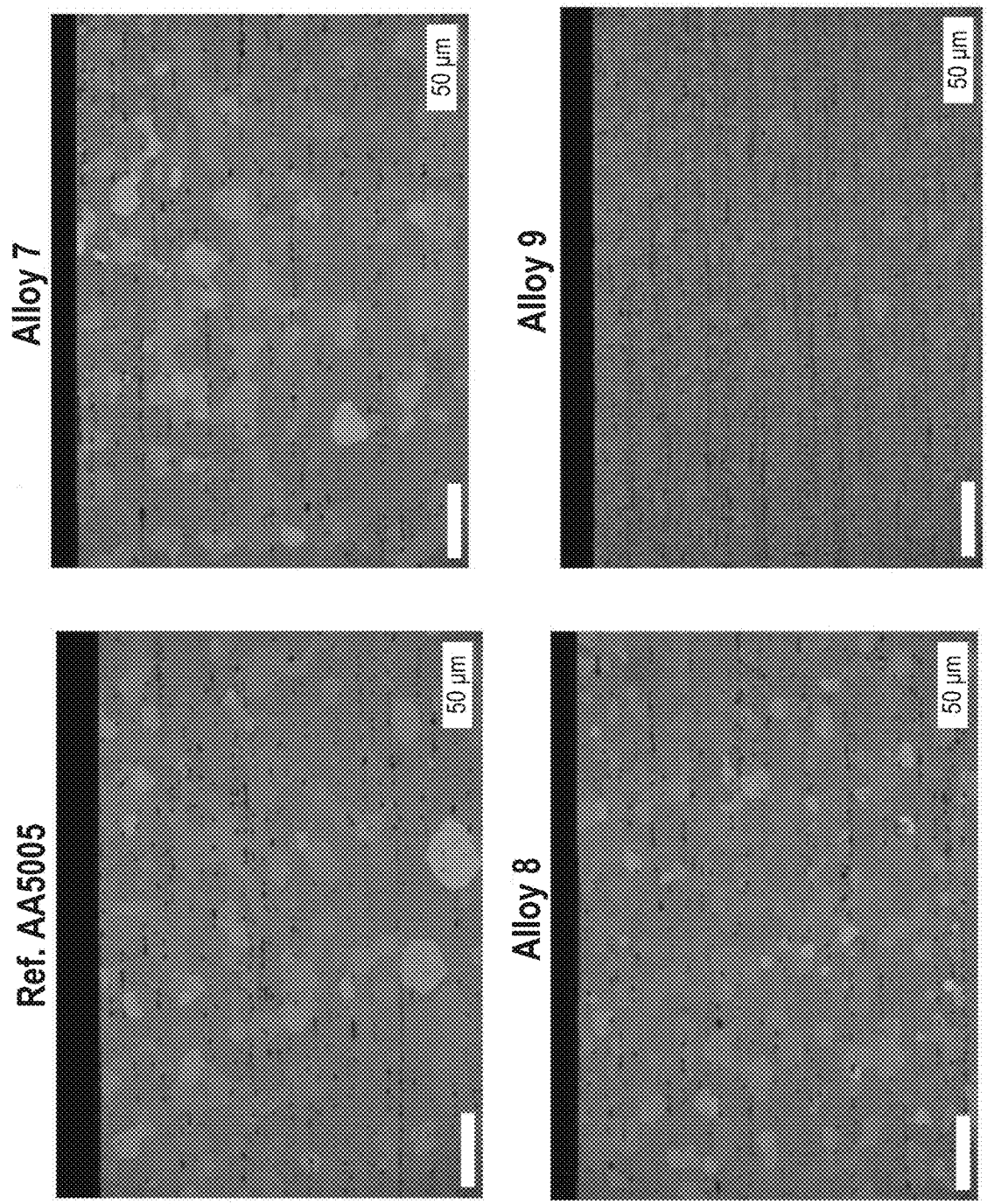
FIG. 8 shows grain structure images for a comparative alloy and for exemplary alloys described herein.

The grain structure was also analyzed for Comparative Alloy 3 ("Ref. AA5005"), Alloy 7, Alloy 8, and Alloy 9 (see FIG. 8). There was no significant reduction of the grain size for Alloys 7 and 8, which contain 0.2 wt. % Fe, as compared to Comparative Alloy 3. However, the addition of 0.45 wt. % Fe, 0.14 wt. % Mn, and 0.1 wt. % Ti results in a fine grain size (Alloy 9).

In summary, the data show that very good bending performance and fine grain size results from including Fe at a level of 0.4 wt. %, as shown by Alloys 4 and 9. In addition, the addition of Co, Ni, and/or Nb similarly leads to good bending performance and fine grain size results for lower Fe levels (e.g., 0.25 wt. %), as shown by Alloy 2.

Example 2

Multi-layer metal sheets were prepared by fusion casting an ingot that was double clad on an AA6016 core, homogenizing the ingot at 545° C.+/−5° C. for at least four hours, and hot rolling the ingot to a thickness of 10 mm at a temperature suitable for self-annealing (approximately 430° C.). The hot rolled sheets were then cold rolled to a thickness of 1.02 mm and subsequently solution heat treated at a peak metal temperature ranging from 545° C. to 565° C. Optionally, an interannealing step was performed at 4 mm at a temperature of 350° C. for 2 hours (see Table 10).

As shown in Table 10, alloy AA6016 was used as the core for Sample A and Alloy 12 was used as the cladding for Sample A. See Table 11 for Alloy 12. Alloy 12 contains 0.4 wt. % Fe, 0.14 wt. % Mn, and 0.1 wt. % Ti. Alloy AA6016 was also used as the core for Sample B and Alloy 13 was used as the cladding layers for Sample B. See Table 11 for Alloy 13. Alloy 13 is similar to Alloy 12, except that Alloy 13 additionally includes 0.15 wt. % V. Comparative Samples A and B each include alloy AA6016 as the core and 11% of Comparative Alloy 4 as the cladding layers. Comparative Sample C includes AA6016 as the core and an AA5005 alloy as the cladding layers.

TABLE 10

| Sample | Interannealing Step | Core | Cladding |
|---|---|---|---|
| A | No | AA6016 | Alloy 12; 2-sided where each layer is 11% of the thickness of the core layer |
| B | No | AA6016 | 11% Alloy 13; 2-sided where each layer is 11% of the thickness of the core layer |
| Comparative Sample A | Yes | AA6016 | Comparative Alloy 4; 2-sided where each layer is 11% of the thickness of the core layer |
| Comparative Sample B | No | AA6016 | Comparative Alloy 4; 2-sided where each layer is 11% of the thickness of the core layer |
| Comparative Sample C | No | AA6016 | AA5005; 2-sided where each layer is 11% of the thickness of the core layer |

TABLE 11

| | Core | Cladding | | |
|---|---|---|---|---|
| Element | AA6016 (wt. %) | Alloy 12 (wt. %) | Alloy 13 (wt. %) | Comparative Alloy 4 (wt. %) |
| Si | 1.35 | 0.05 | 0.05 | 0.18 |
| Fe | 0.2 | 0.37 | 0.40 | 1.0 |
| Cu | 0.11 | 0.005 | 0.005 | 0.005 |
| Mn | 0.08 | 0.13 | 0.13 | 0.005 |
| Mg | 0.31 | 0.05 | 0.05 | 0.05 |
| Cr | 0.01 | 0.005 | 0.005 | 0.005 |
| Ni | — | — | — | — |
| Zn | — | — | — | — |
| Ti | 0.02 | 0.12 | 0.10 | 0.01 |
| V | 0.008 | — | 0.13 | 0.008 |

All expressed in wt. %. Up to 0.15 wt. % impurities. Remainder is Al.

Recyclability

For recycling purposes, the Fe content of the multi-layer sheet should be 0.28% or lower to prevent Fe-containing 6xxx scrap. Fe levels higher than 0.28% in a 6xxx alloy (e.g., an AA6016 alloy or an AA6014 alloy) have detrimental effects on elongation and bending. The elemental content of a multi-layer sheet as described herein (Sample C), containing 0.45 wt. % Fe in the clad layers, and of a comparative multi-layer sheet (Comparative Sample D), containing 1.1% Fe in the clad layers, are shown in Tables 12 and 13, respectively. As shown in Table 12, the iron content of the multi-layer sheet as described herein was 0.25%, which is within the acceptable limit in terms of recyclability. The iron content of the comparative multi-layer sheet, prepared using a AA8079 clad, was 0.38%, which indicates the comparative multi-layer sheet is not suitable for recycling (see Table 13).

TABLE 12

| Sample C | | | | |
|---|---|---|---|---|
| | Layer Thickness (%) | Fe (%) | Mn (%) | Ti (%) | V (%) |
| Clad | 10.0% | 0.45 | 0.14 | 0.10 | 0.015 |
| Core | 80.0% | 0.2 | 0.08 | 0.02 | 0.008 |
| Total Element in Multi-Layer Sheet | | 0.25 | 0.092 | 0.0360 | 0.0364 |

TABLE 13

| Comparative Sample D | | | | |
|---|---|---|---|---|
| | Layer Thickness (%) | Fe (%) | Ti (%) | V (%) |
| Clad | 10.0% | 1.1 | 0.01 | 0.008 |
| Core | 80.0% | 0.2 | 0.02 | 0.008 |
| Total Element in Multi-Layer Sheet | | 0.38 | 0.0180 | 0.008 |

Grain Structure

Figure 9:
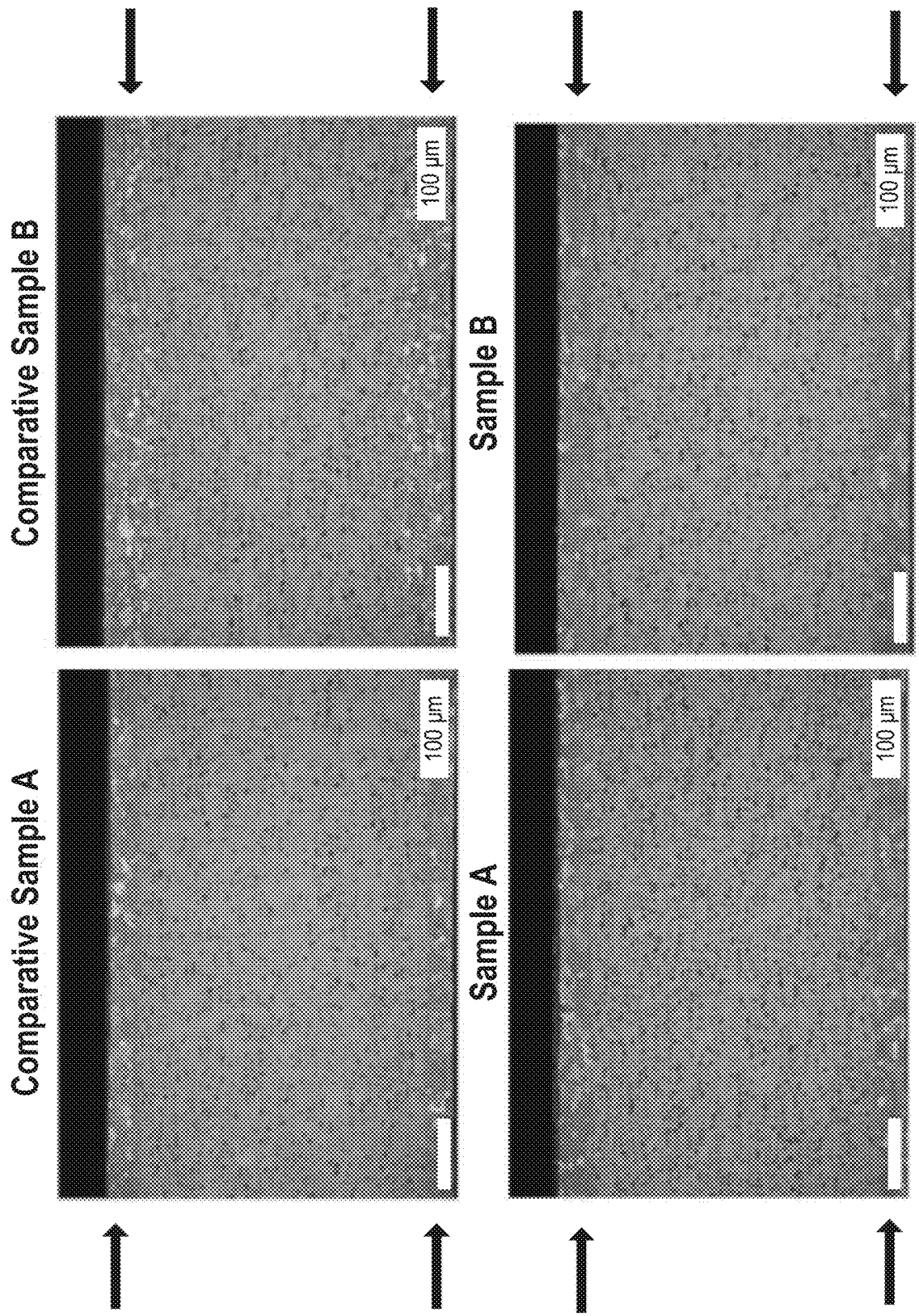
FIG. 9 shows grain structure images for comparative multi-layer sheets and for exemplary multi-layer sheets described herein. The arrows indicate the clad layers in the multi-layer sheets.
Figure 10:
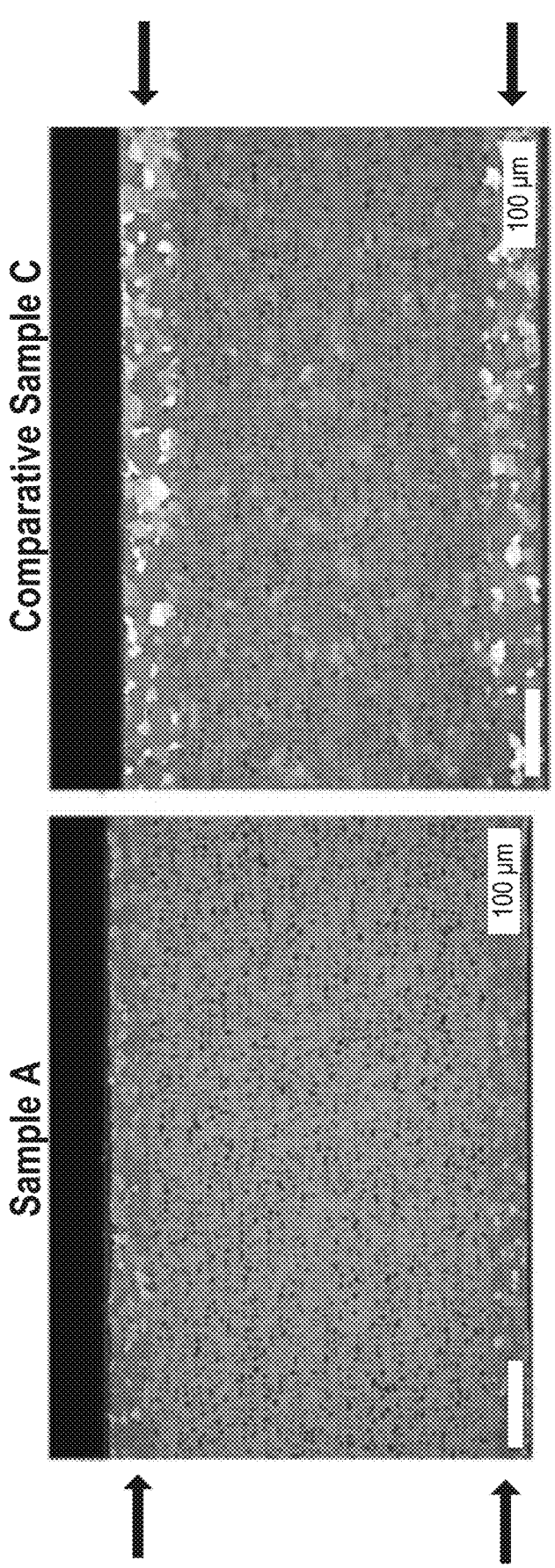
FIG. 10 shows grain structure images for a comparative multi-layer sheet and for an exemplary multi-layer sheet described herein. The arrows indicate the clad layers in the multi-layer sheets.

As described above, fine grain size is needed for drawing parts that demand high forming and also to avoid orange peel effects. The grain structure was analyzed for each of Samples A and B and Comparative Samples A and B. As shown in FIG. 9, the grain size in Samples A and B, which contained 0.45 wt. % Fe in the cladding layer, is relatively small and similar in size to Comparative Sample B, which contained 1 wt. % Fe in the cladding layer. The grain sizes of Samples A and B are smaller than Comparative Sample A, which was processed using an interannealing step, as described above. The grain size in Sample A was also compared to Comparative Sample C. As shown in FIG. 10, the grain size in Sample A is finer than in Comparative Sample C.

Particle Distribution and Size

Figure 11:
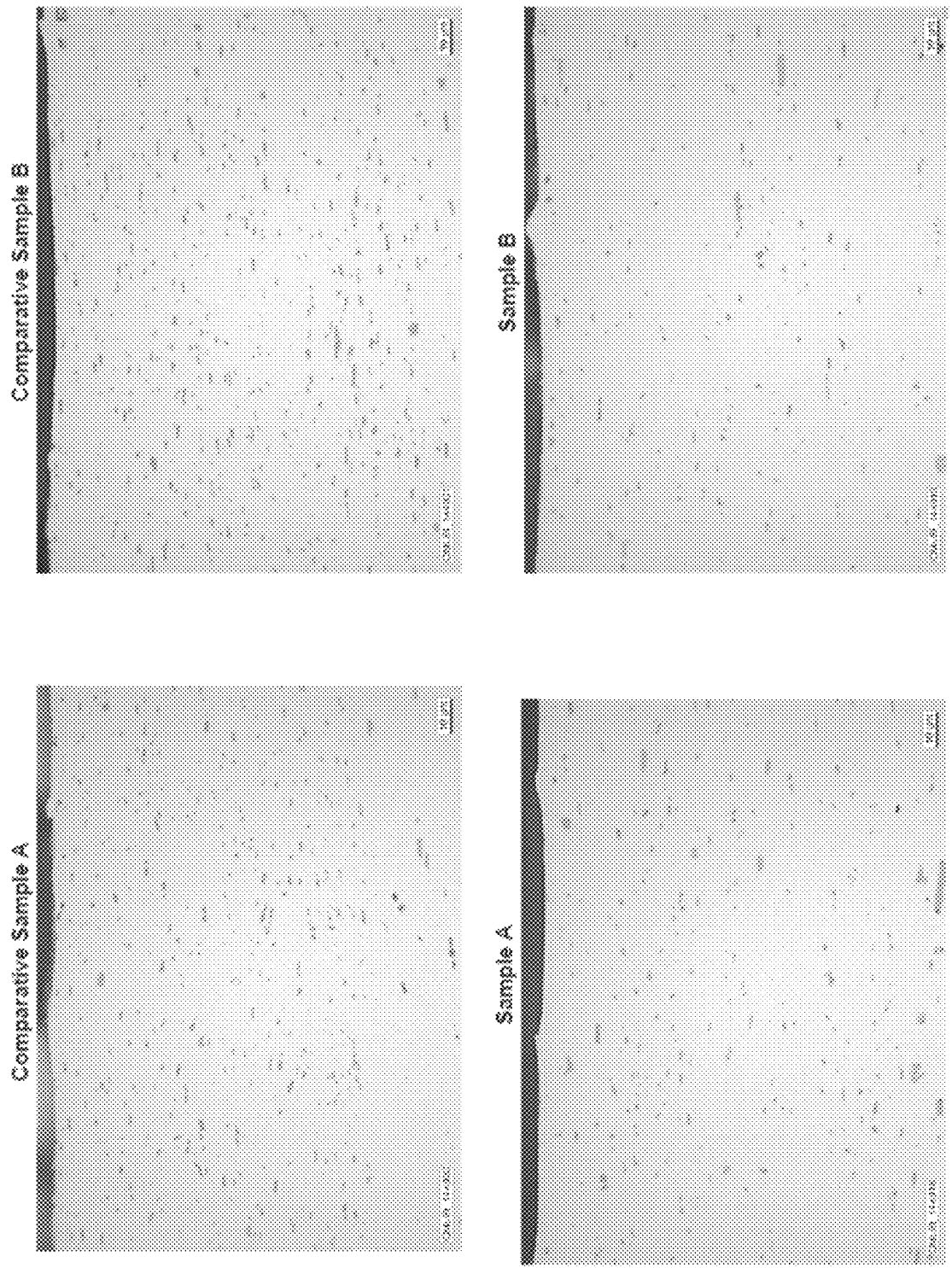
FIG. 11 shows images of the iron (Fe) particle size and distribution for comparative multi-layer sheets and for exemplary multi-layer sheets described herein.

The distribution of Fe particles was analyzed for each of Samples A and B and Comparative Samples A and B. As shown in FIG. 11, the Fe particle size in Samples A and B is small. Comparative Samples A and B, which both have a high Fe content, possess more Fe particles than Samples A and B. As Samples A and B have similar or smaller grain size as compared to Comparative Samples A and B, the fine grain size of Samples A and B result from the fine Fe particle size and also from the effect of intermetallic promoter elements, such as Mn, Ni, Ti, Co, Nb, Cr, Zr, Hf, Ta, and V.

Figure 12:
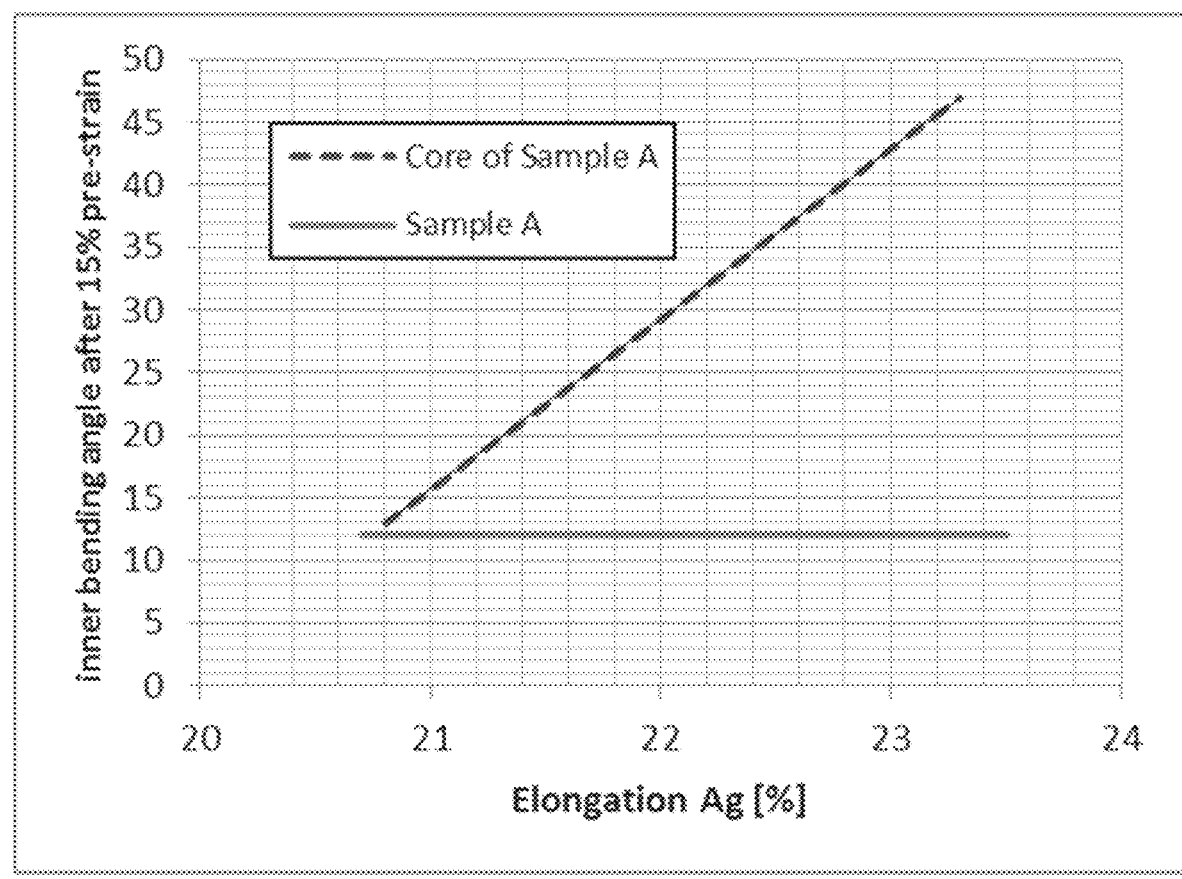
FIG. 12 is a graph showing the bending effect versus elongation ($A_g$ [%]) for a core alloy and for an exemplary multi-layer sheet described herein.

Elongation and Bending of the Multi-Layered Package versus a Monolithic Core Alloy High elongation and very good bending are key criteria for parts requiring high forming, such as motor vehicle parts (e.g., bodyside, door inner panels, decklid inner panels, decklid outer panels, hood inner panels, front wall parts, etc.). Sample A, as described above, and the monolithic core alloy of Sample A were subjected to 15% pre-strain. The elongation and inner bending angle were compared for the monolithic core alloy of Sample A and for Sample A. High elongation was achieved with both the monolithic core alloy or with the multi-layered package as described herein by using different solution heat treatment steps. See FIG. 12. However, Sample A exhibited superior bending as compared to the core alloy of Sample A. Specifically, Sample A (i.e., multi-layer package) maintained very good bending with an inner bending angle below 15° and an elongation (Ag) 90° to the rolling direction, of higher than 23%.

Strength

Figure 13:
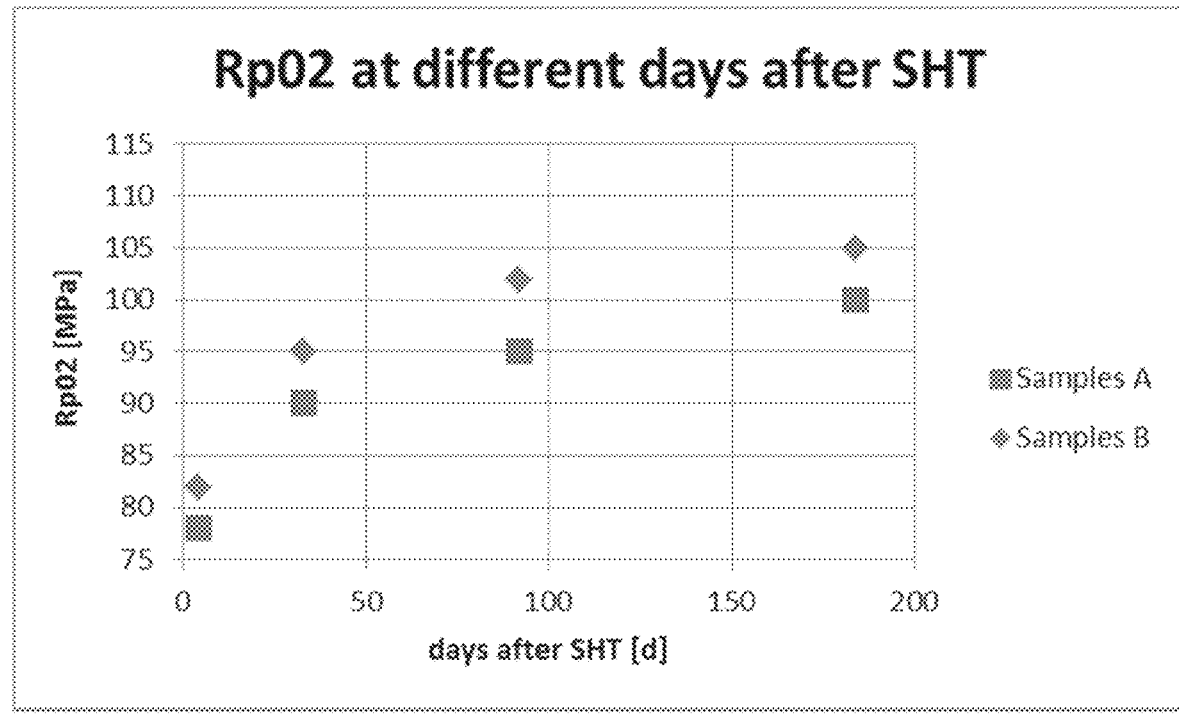
FIG. 13 is a graph showing the strength level (Rp02 [MPa]) at different time intervals after solution heat treatment (SHT) for exemplary multi-layer sheets described herein.

For automotive deep drawing parts, a lower incoming strength is required to minimize spring-back effects. According to industry standards, the incoming strength is guaranteed to be within a certain range for up to 6 months after solution heat treatment. Thus, suitable parts must demonstrate stability in strength properties over a period of time by maintaining strength values between 70 MPa to 110 MPa. The strength levels for Samples A and B were measured at different days after solution heat treatment (SHT) according to DIN EN ISO 6892-1:2009 and 90° to the rolling direction. The strength levels of the multi-layer packages as described herein, such as Samples A and B described above, remained within the range of 70 MPa to 110 MPa up to 180 days. See FIG. 13.

Paint Bake Response

The minimum paint bake response for multi-layer packages Samples A and B was determined after 2% pre-strain 90° to the rolling direction and artificial aging of 185° C. for 20 minutes. The yield strength, determined as the $Rp_{0.2}$ value, was greater than 160 MPa. The ultimate tensile strength, determined as the $R_m$ value, was greater than 220 MPa. The total elongation, determined as the $A_{80}$ value, was greater than 18%.

Cross-Die

Cross-die tests were performed on the core of Sample A and on Samples A and B. See Table 10. The cross-die tests were performed with a standard cross-die tool at a clamping force of 25 kN, a stamping speed of 20 mm/min, and a stamping depth between 40-60 mm. The size of the starting blanks was 250 mm in width and 250 mm in length and the starting thickness was 1.02 mm. The sheets were lubricated using an electrostatic spray bar with a hot melt at a coating weight of 1.5 g/m² to remove potential friction effects during the cross-die test.

Figure 20:
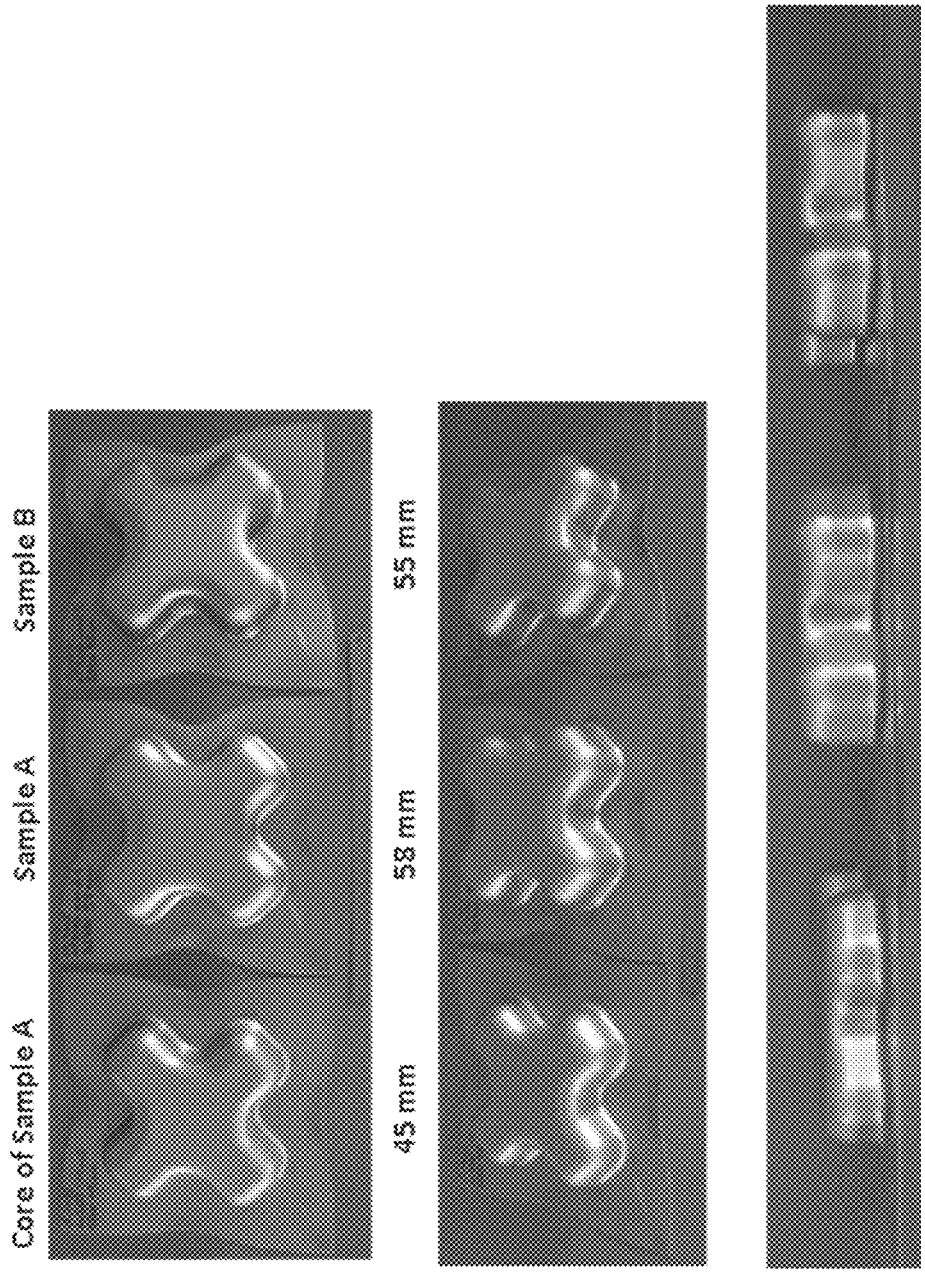
FIG. 20 shows pictures of different views of a core alloy and two exemplary multi-layer alloys as described herein after subjecting the alloys to a cross-die test.

As shown in FIG. 20, Samples A and B performed better in the cross-die stamping test than the comparative core of Sample A. Specifically, Sample A provided a depth of 58 mm and Sample B provided a depth of 55 mm, while the comparative core of Sample A provided a depth of only 45 mm.

Corrosion and Bonding

For automotive panels, the alloys formed from the ingots need to be resistant to automotive corrosion tests like the copper-accelerated acetic acid salt spray (CASS) and filiform tests. The CASS test exposes the samples to a highly corrosive environment for corrosion resistance analysis. The filiform test is employed to analyze the corrosion of coated alloy samples. Another important criteria can be the bonding performance of the surface of the exemplary clad.

Figure 21:
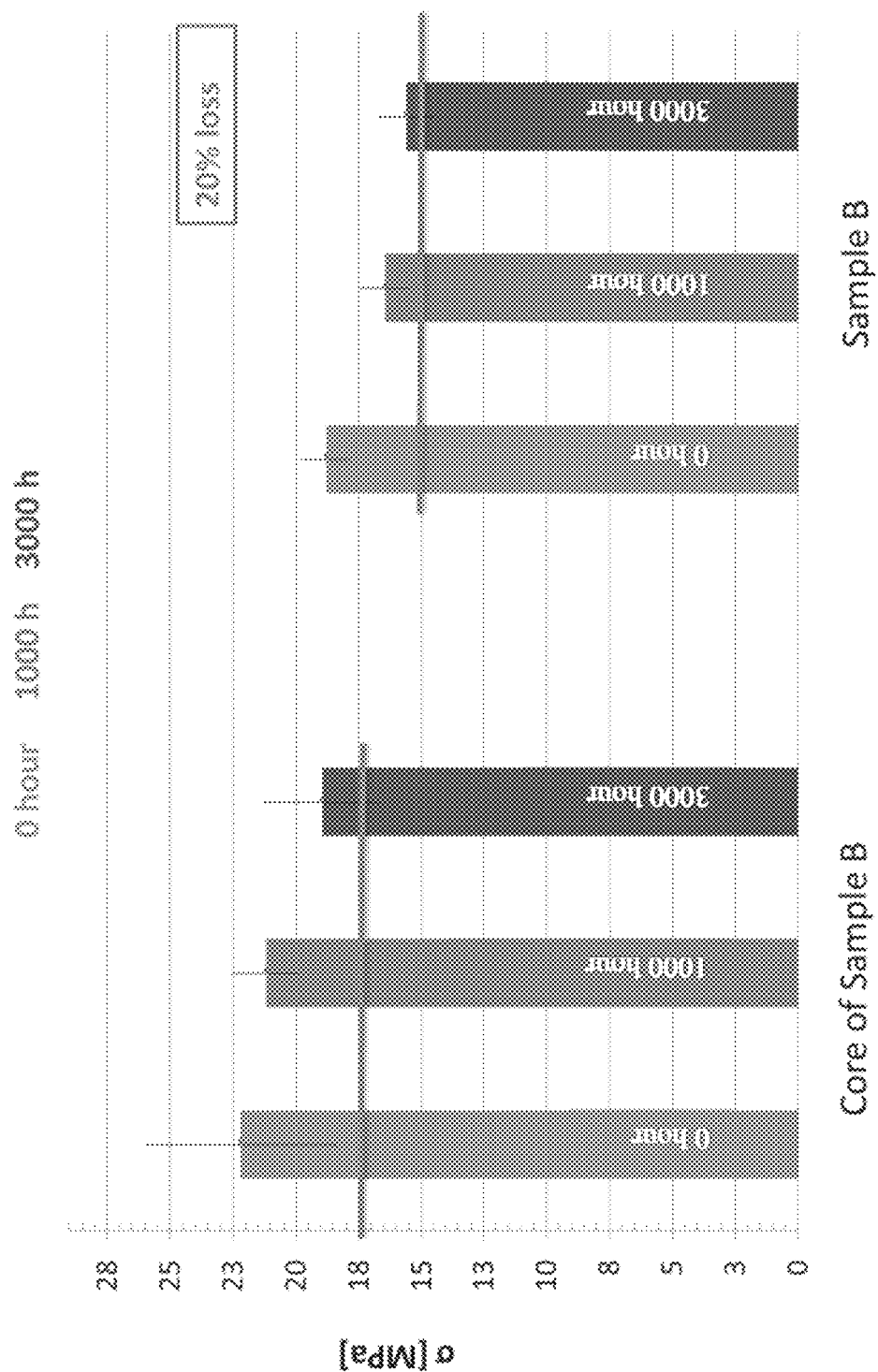
FIG. 21 is a graph depicting the bonding results after 0 hours (first histogram bar), 1000 hours (second histogram bar), and 3000 hours (third histogram bar) exposure to a corrosive environment in the neutral salt-spray test (NSS35° C.) for the core of an exemplary alloy Sample B as described herein (left) compared with an exemplary core-clad alloy Sample B as described herein (right).

The core of Sample B and the core-clad Sample B were analyzed for comparison. FIG. 21 shows the results of analyzing the bonding performance of the different alloys. A neutral salt spray (NSS 35° C.) test was used to evaluate the bonding performance of the alloys. The NSS 35° C. test was performed according the specifications known to persons having ordinary skill in the art and consistent with the following: The bonding adhesive used for the NSS 35° C. test was BETAMATE™ BM1630 (Dow Automotive Systems). The bonded samples were Zn-phosphated and E-coated prior to the NSS 35° C. test. The strength loss was measured according to the DIN EN 1465 test standard. Sample B, as well as the core of Sample B, showed good bonding results, even after a 3000-hour exposure to a corrosive environment defined in the DIN EN ISO 9227 standard. The maximum allowable strength loss of 20% was not observed for either alloy.

Figure 22A:
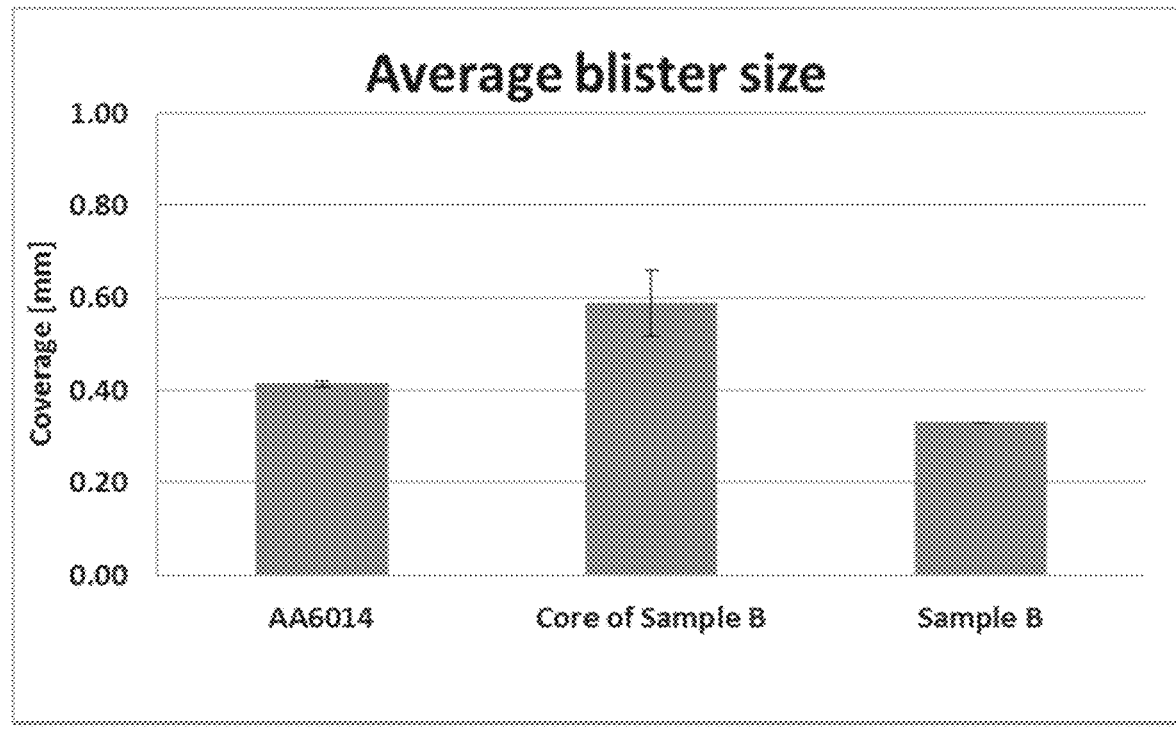
FIG. 22A is a graph depicting the average blister size after copper-assisted acetic acid salt spray (CASS) test for a comparative alloy AA6014 (left bar), the core of the exemplary alloy Sample B as described herein (middle bar) and the exemplary core-clad alloy Sample B as described herein (right bar).
Figure 22B:
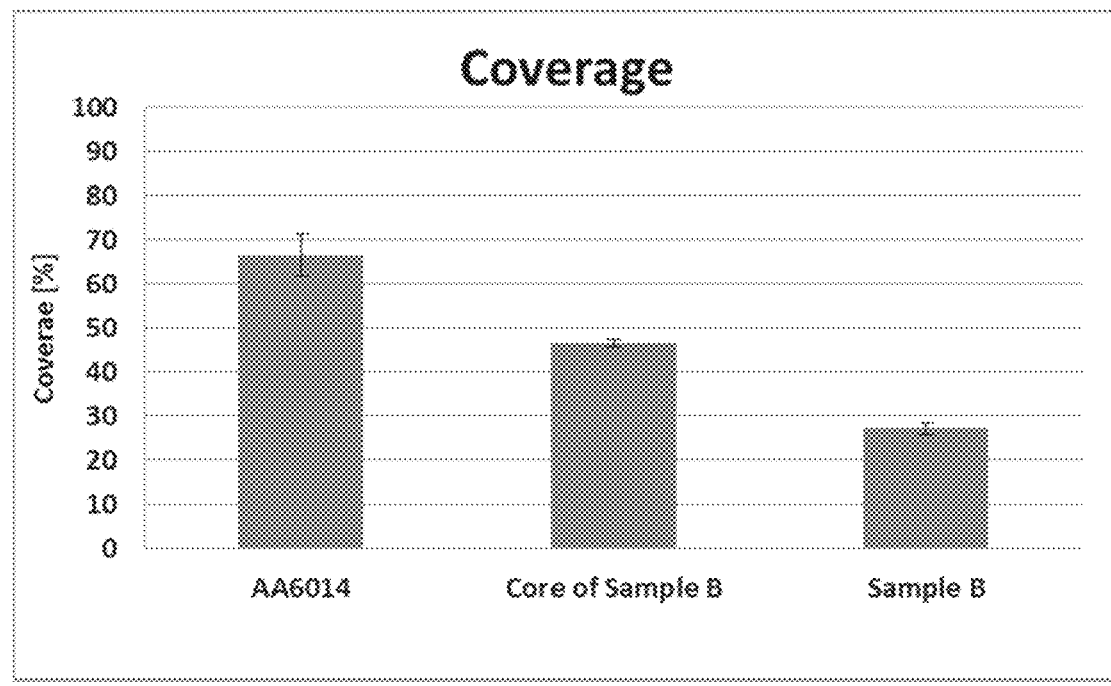
FIG. 22B is a graph depicting the percentage of blister coverage along scratch lines of a comparative alloy AA6014 (left bar), the core of the exemplary alloy Sample B as described herein (middle bar) and the exemplary core-clad alloy Sample B as described herein (right bar).

FIGS. 22A and 22B show results of surface analysis of Sample B, the core of Sample B and a comparative alloy, AA6014, after CASS testing. The CASS test was performed according to the DIN EN ISO 9227 standard. Prior to exposure to corrosive conditions, the samples were Zn-Phosphated and E-coated according to specifications known to persons having ordinary skill in the art, then prepared with scratches according to DIN EN ISO 17872. FIG. 22A shows the average blister in the coating measured on the corroded scratches was below 1 mm. FIG. 22B shows coverage of the blisters in the coating along the scratches. FIG. 22B shows both alloys Sample B and the core of Sample B demonstrated superior resistance to blistering than the comparative alloy AA6014.

Figure 23A:
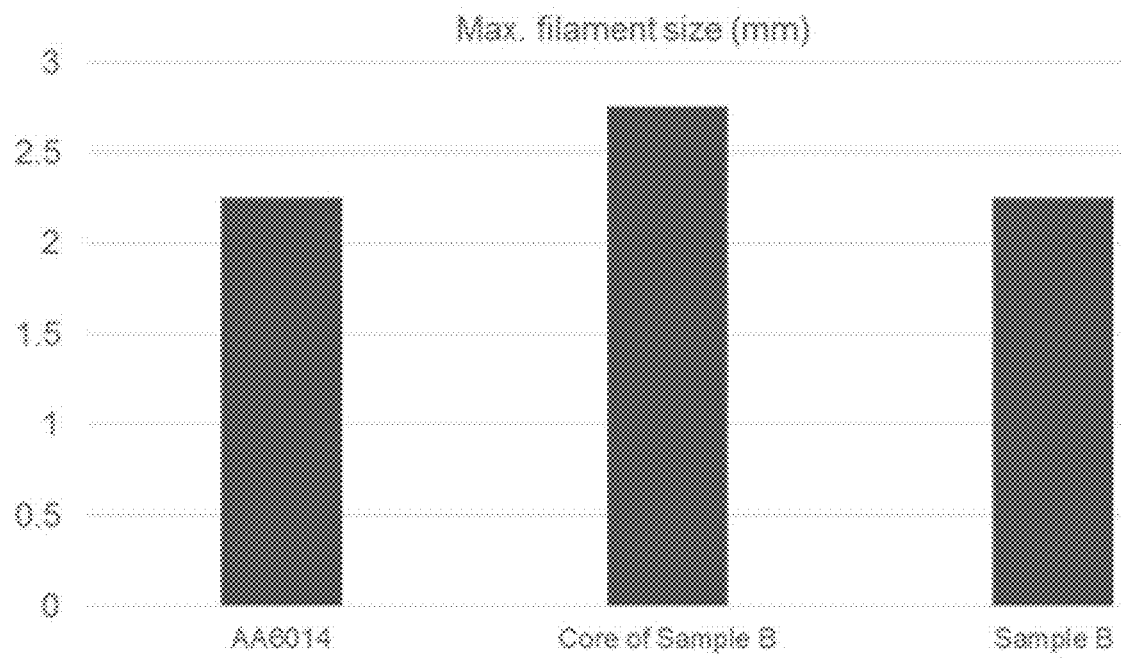
FIG. 23A is a graph depicting the maximum filament size after filiform corrosion test for a comparative alloy AA6014 (left bar), the core of the exemplary alloy Sample B as described herein (middle bar) and the exemplary core-clad alloy Sample B as described herein (right bar).
Figure 23B:
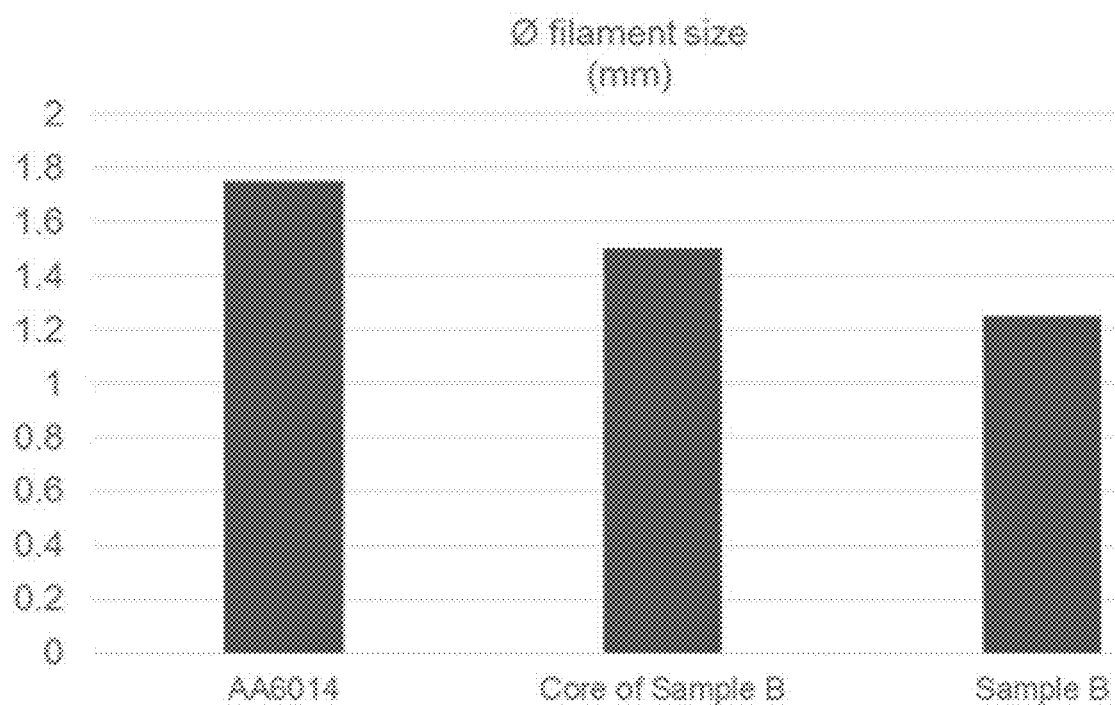
FIG. 23B is a graph depicting the average filament size for the same for a comparative alloy AA6014 (left bar), the core of the exemplary alloy Sample B as described herein (middle bar) and the exemplary core-clad alloy Sample B as described herein (right bar).

FIGS. 23A and 23B show results of surface analysis of Sample B, the core of Sample B and the comparative alloy, AA6014, after filiform testing. The samples were Zn-phosphated and E-coated. The samples were tested under filiform corrosion conditions according to DIN EN ISO 9227. The filament sizes were measured according to DIN EN ISO4628-10. Both Sample B and the core of Sample B performed as well or superior to the comparative alloy AA6014.

In both the CASS and filiform corrosion tests, the exemplary alloys described herein demonstrated superior corrosion resistance when compared to the comparative alloy AA6014.

Summary

Parts requiring high forming, such as motor vehicle parts (e.g., body sides) require maximum elongation, superior bending properties, fine grain size, and must be highly recyclable. As described above and as summarized in Table 14 below, the multi-layered packages Samples A and B are capable of achieving each of these requirements. The comparative multi-layer sheets, containing cladding layers prepared from AA1050, AA8079, or AA5005 alloys, suffered in one or more of the required areas.

TABLE 14

| Properties | Clad with Ref. AA1050 | Clad with Ref. AA8079 | Clad with Ref. AA5005 | Samples A and B |
|---|---|---|---|---|
| Recycling | Good | Very bad (high Fe-content) | Good | Good |
| Elongation | Good | Good | Sufficient | Good |
| Grain size | Bad (orange peel) | Good | Bad (orange peel) | Good |
| Bending | Good | Good | Sufficient | Good |

Example 3

Alloys for use as the cladding layers as described herein were prepared as described above in Example 1. The elemental composition ranges for the prepared alloys are shown in Table 15. Comparative Alloy 5 is an alloy that primarily contains aluminum, silicon, and iron. Comparative Alloy 6 is an alloy that primarily contains aluminum, silicon, iron, and manganese. Alloys 14, 15, 16, 17, 18, 19, 20, 21, 22, 23, and 24 are prototype alloys.

TABLE 15

| Alloy | Si | Fe | Mn | Cr | Ti | Zr | V | Co | Ni |
|---|---|---|---|---|---|---|---|---|---|
| Comparative Alloy 5 | 0.03 | 0.85 | — | — | — | — | — | — | — |
| Comparative Alloy 6 | 0.10 | 1.04 | 0.19 | — | — | — | — | — | — |
| Alloy 14 | 0.08 | 0.43 | — | — | — | — | — | — | — |
| Alloy 15 | 0.08 | 0.44 | 0.14 | — | — | — | — | — | — |
| Alloy 16 | 0.08 | 0.44 | 0.14 | 0.10 | — | — | — | — | — |
| Alloy 17 | 0.08 | 0.44 | 0.14 | — | — | 0.15 | — | — | — |
| Alloy 18 | 0.08 | 0.19 | 0.14 | — | — | — | — | 0.23 | — |
| Alloy 19 | 0.08 | 0.44 | 0.14 | — | — | — | — | — | 0.23 |
| Alloy 20 | 0.08 | 0.45 | 0.14 | — | — | — | — | 0.24 | — |
| Alloy 21 | 0.08 | 0.47 | 0.14 | — | — | — | — | 0.14 | 0.15 |
| Alloy 22 | 0.08 | 0.47 | 0.15 | — | 0.05 | — | 0.14 | — | — |
| Alloy 23 | 0.08 | 0.48 | 0.14 | — | 0.13 | — | 0.06 | — | — |
| Alloy 24 | 0.08 | 0.49 | 0.20 | — | 0.11 | — | 0.14 | — | — |

All expressed in wt. %. Up to 0.15 wt. % impurities. Remainder is Al.

Strength and Elongation

The strength and elongation properties of the alloys listed in Table 15, in the T4 temper, were measured. See FIGS. 15 and 16. The yield strength and tensile strength were measured according to method DIN EN ISO 6892-1:2009, at 0° (longitudinal), 45°, and 90° (transverse) to the rolling direction. The elongation was measured according to method DIN EN ISO 6892-1:2009, at 0°, 45°, and 90° to the rolling direction.

Figure 15:
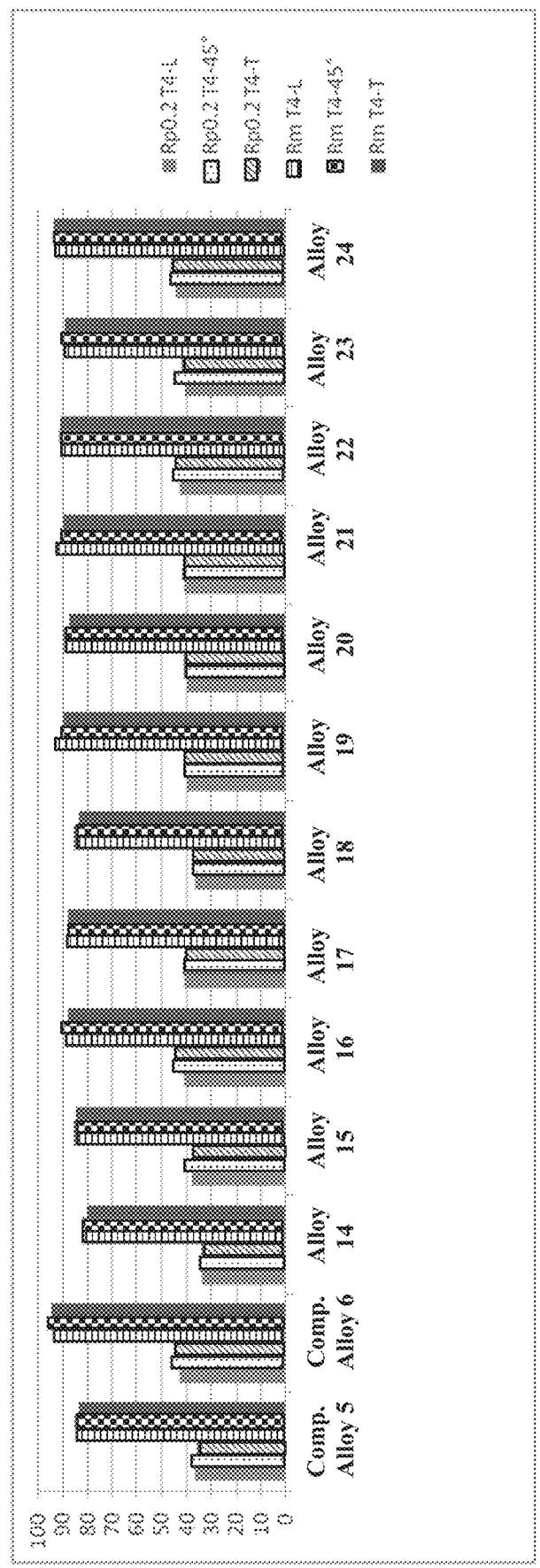
FIG. 15 is a graph showing the yield strength (Rp0.2) and tensile strength (Rm) for exemplary alloys measured at 0° (indicated as "L"), 45°, and 90° (indicated as "T") to the rolling direction. The first histogram bar of each set represents the yield strength as measured at 0° to the rolling direction. The second histogram bar of each set represents the yield strength as measured at 45° to the rolling direction. The third histogram bar of each set represents the yield strength as measured at 90° to the rolling direction. The fourth histogram bar of each set represents the tensile strength as measured at 0° to the rolling direction. The fifth histogram bar of each set represents the tensile strength as measured at 45° to the rolling direction. The sixth histogram bar of each set represents the tensile strength as measured at 90° to the rolling direction.
Figure 16:
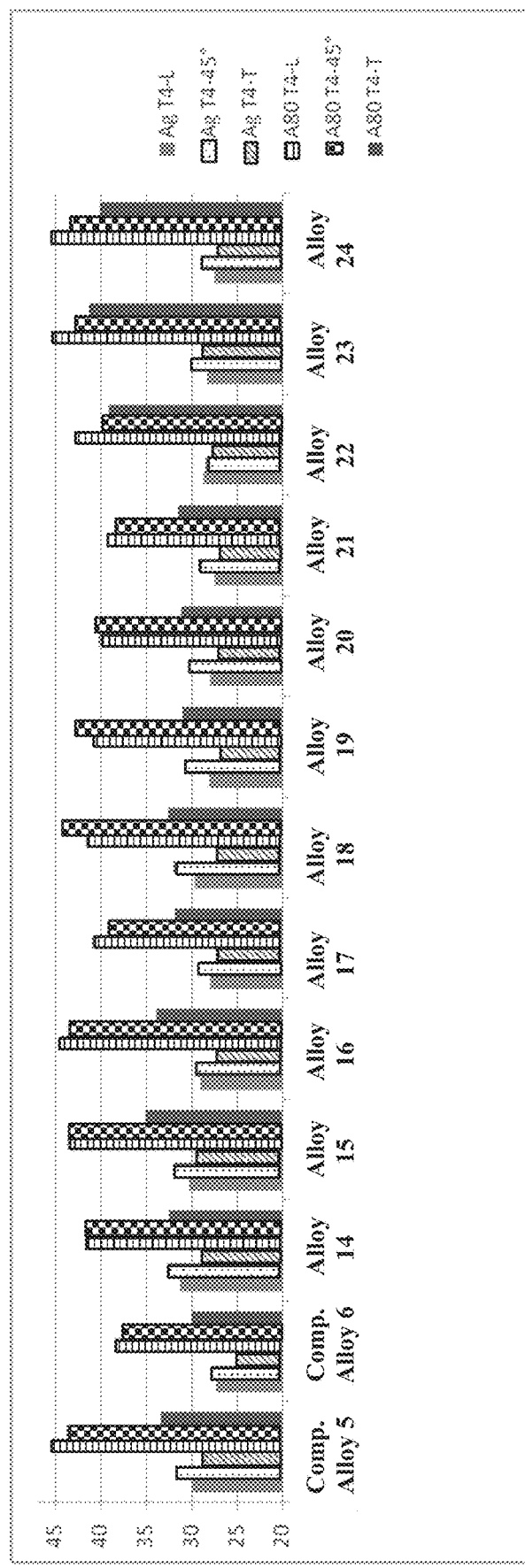
FIG. 16 is a graph showing the high uniform elongation (Ag) and the elongation at break ($A_{80}$) for exemplary alloys measured at 0° (indicated as "L"), 45°, and 90° (indicated as "T") to the rolling direction. The first histogram bar of each set represents the high uniform elongation as measured at 0° to the rolling direction. The second histogram bar of each set represents the high uniform elongation as measured at 45° to the rolling direction. The third histogram bar of each set represents the high uniform elongation as measured at 90° to the rolling direction. The fourth histogram bar of each set represents the elongation at break as measured at 0° to the rolling direction. The fifth histogram bar of each set represents the elongation at break as measured at 45° to the rolling direction. The sixth histogram bar of each set represents the elongation at break as measured at 90° to the rolling direction.
Figure 17:
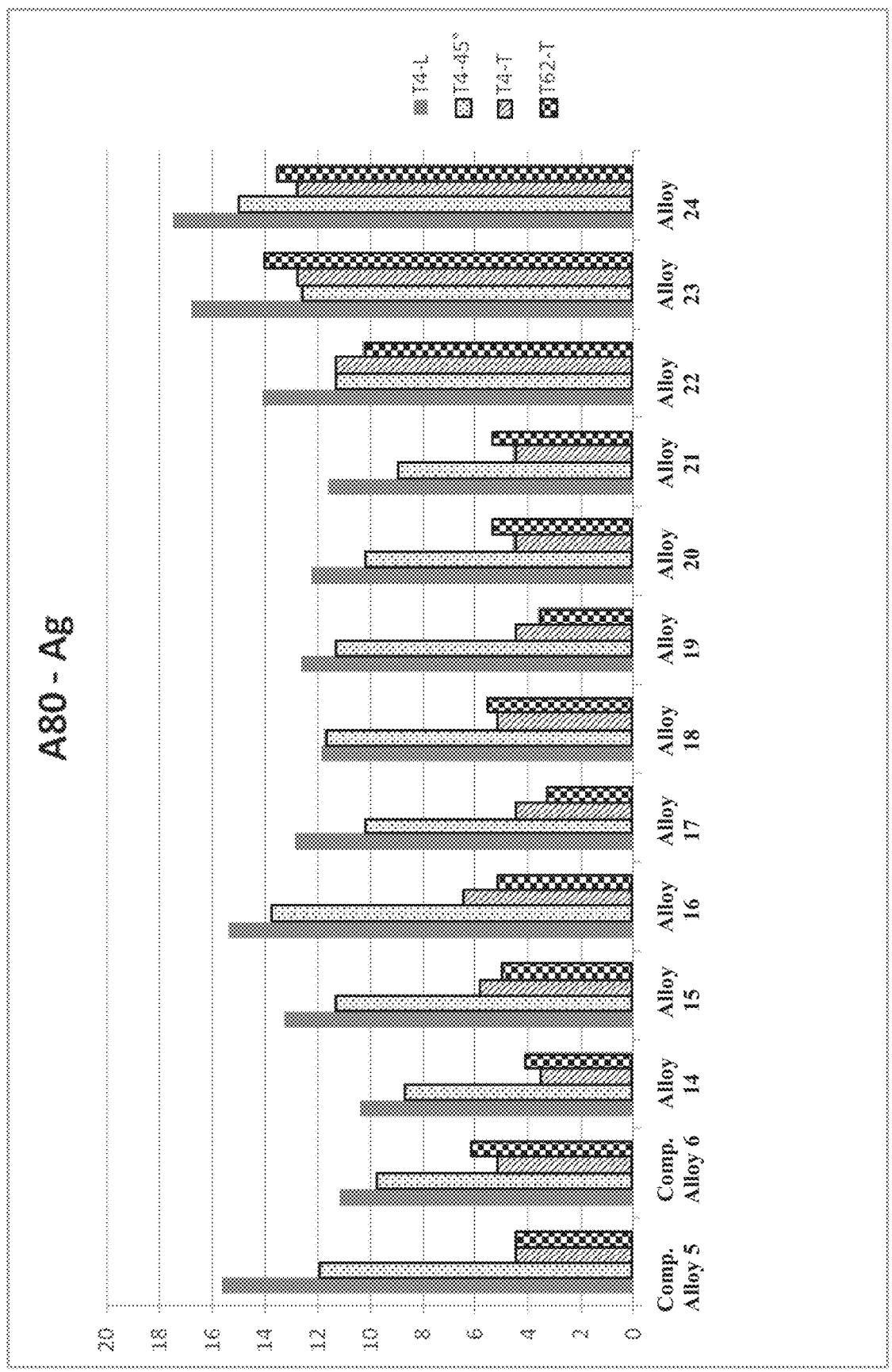
FIG. 17 is a graph showing the difference between the elongation at break and the high uniform elongation for exemplary alloys measured at 0° (indicated as "L"), 45°, and 90° (indicated as "T") to the rolling direction. The first histogram bar of each set represents the difference in the values as measured at 0° to the rolling direction. The second histogram bar of each set represents the difference in the values as measured at 45° to the rolling direction. The third histogram bar of each set represents the difference in the values as measured at 90° to the rolling direction. The fourth histogram bar of each set represents the difference in the values as measured at 90° to the rolling direction after subjecting the alloy to a temperature of 205° C. for 30 minutes.

As shown in FIG. 15, Alloys 14-24, which contained Fe in the range of 0.2 to 0.45 wt. %, displayed similar yield strengths (Rp0.2) and tensile strengths (Rm) as the alloys containing higher amounts of Fe (i.e., Comparative Examples 5 and 6). As shown in FIG. 16, Alloys 14-24 displayed relatively high uniform elongation ($A_g$) and elongation at break ($A_{80}$) percentages in all measured directions. In addition, alloys containing 0.45 wt. % or 0.48 wt. % of Fe in combination with Mn, Ti, and V (i.e., Alloys 22, 23, and 24) resulted in high elongation at break ($A_{80}$) values in all three directions and particularly at 0° to the rolling direction. FIG. 17 depicts the difference between the elongation at break and the uniform elongation percentages for the Comparative Alloy 5, Comparative Alloy 6, and Alloys 14-24 at 0°, 45°, and 90° to the rolling direction. The elongation properties of the alloys in the T62 temper in the transverse direction were also measured. The T62 temper was achieved by heating the alloy for 30 minutes at 205° C. As shown in FIG. 17, the alloys containing Ti and V (i.e., Alloys 22, 23, and 24) resulted in high $A_{80}$ values in the transverse direction.

Grain Size

Figure 18:
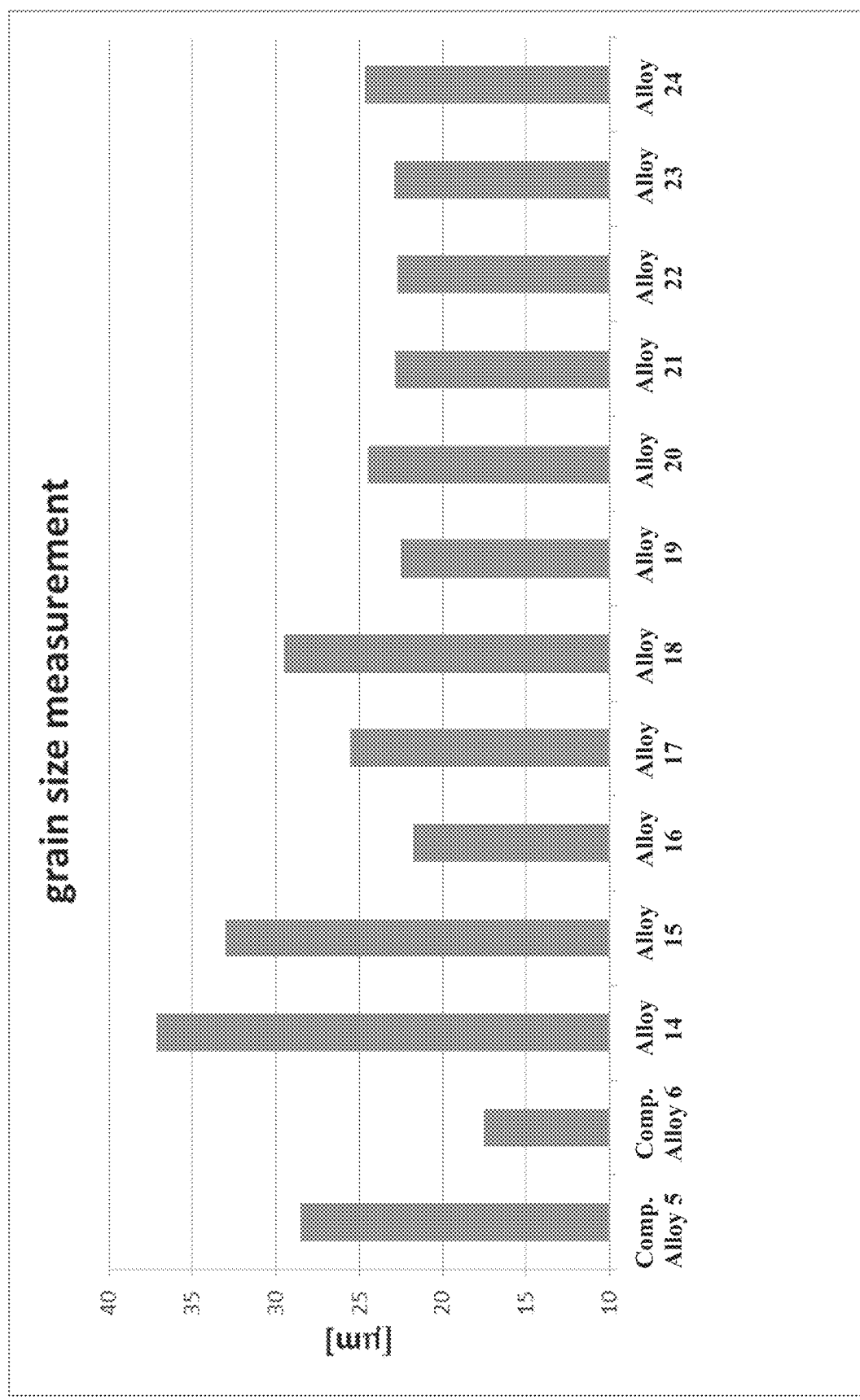
FIG. 18 is a graph depicting the grain size for comparative and exemplary alloys as described herein.
Figure 19A:
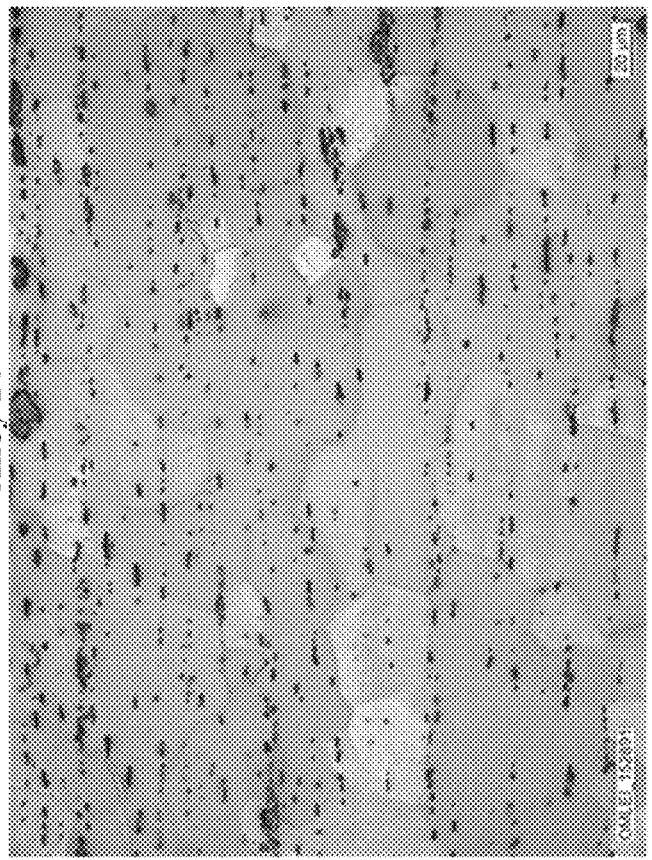
FIG. 19A shows a grain structure image for an exemplary Alloy 14 as described herein.
Figure 19B:
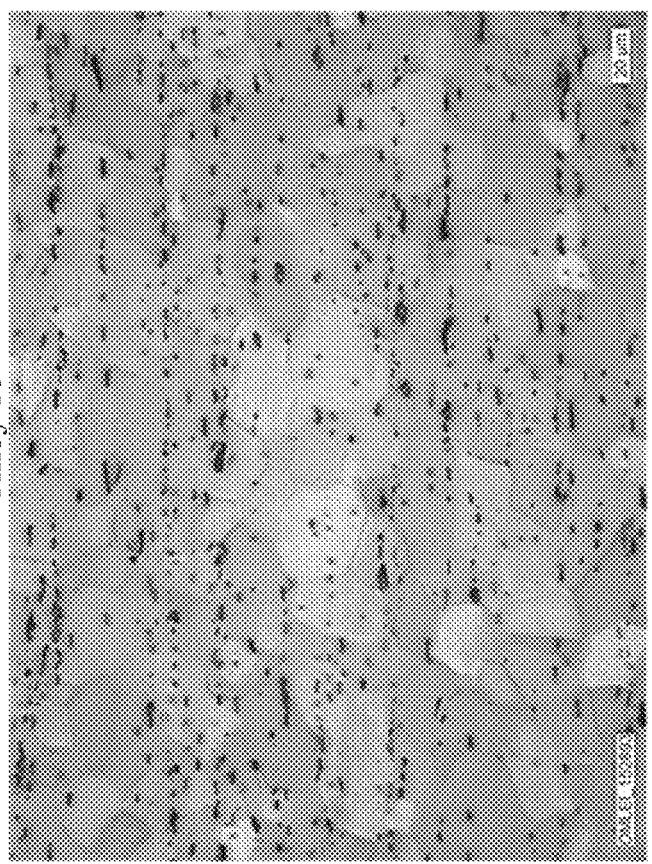
FIG. 19B shows a grain structure image for an exemplary Alloy 16 as described herein.

The grain size for the comparative alloys and the exemplary alloys was analyzed by optical microscopy using an electron back-scattered diffraction technique in a scanning electron microscope (SEM-EBSD). As shown in FIG. 18, Alloys 14 and 15 that contain iron and aluminum only or iron, manganese, and aluminum only resulted in relatively large grain sizes. Alloys 16 and 19-24, however, all displayed grain size values of 25 μm and smaller. Alloys 17 and 18 showed grain size between 25 μm and 30 μm. The SEM images of Alloy 14 and Alloy 16 are shown and compared in FIGS. 19A and 19B.

Summary

In some cases, optimal formability was observed in alloys with the smallest average grain size, highest elongation ($A_{80}$) at 0° (indicated as "L"), 45°, and 90° (indicated as "T") to the rolling direction and the combined composition of Fe, Mn, Cr, Ti, Co, Ni and V was between 0.60 and 0.90 wt. % (e.g., 0.60 wt. %≤[Fe+Mn+Cr+Ti+Co+Ni+V]≤0.90 wt. %).

Example 4

Alloys for use as the cladding layers as described herein were prepared as described above in Example 1. The elemental composition ranges for the prepared alloys are shown in Table 16. Alloys 25, 26, 27, 28, 29, 30, 31, 32, 33, 34 and 35 are exemplary alloys. To augment the recycling content of the fusion-cast alloy with scrap coming from core alloy 2xxx, 5xxx, 6xxx and 7xxx alloys, some additions of Si, Cu, Mg and Zn on the cladding layer were tested.

TABLE 16

| Alloy | Si | Fe | Cu | Mn | Mg | Zn | Hf | Ta | Ti |
|---|---|---|---|---|---|---|---|---|---|
| Alloy 25 | 0.04 | 0.51 | 0.06 | 0.14 | | | | | 0.08 |
| Alloy 26 | 0.04 | 0.41 | 0.19 | 0.14 | | | | | 0.12 |
| Alloy 27 | 0.03 | 0.37 | 0.4 | 0.14 | | | | | 0.11 |
| Alloy 28 | 0.11 | 0.32 | 0.2 | 0.14 | | 0.2 | | | 0.15 |
| Alloy 29 | 0.09 | 0.48 | | 0.14 | | 0.2 | | | 0.11 |
| Alloy 30 | 0.05 | 0.51 | | 0.14 | | 0.41 | | | 0.07 |
| Alloy 31 | 0.05 | 0.29 | | 0.15 | 0.2 | | | | 0.05 |
| Alloy 32 | 0.05 | 0.33 | | 0.15 | 0.35 | | | | 0.08 |
| Alloy 33 | 0.11 | 0.37 | | 0.15 | 0.21 | | | | 0.11 |
| Alloy 34 | 0.08 | 0.41 | | 0.14 | | | | 0.07 | 0.12 |
| Alloy 35 | 0.08 | 0.44 | | 0.13 | | | 0.19 | | 0.11 |

All expressed in wt. %. Up to 0.15 wt. % impurities. Remainder is Al.

Grain Size

Figure 24:
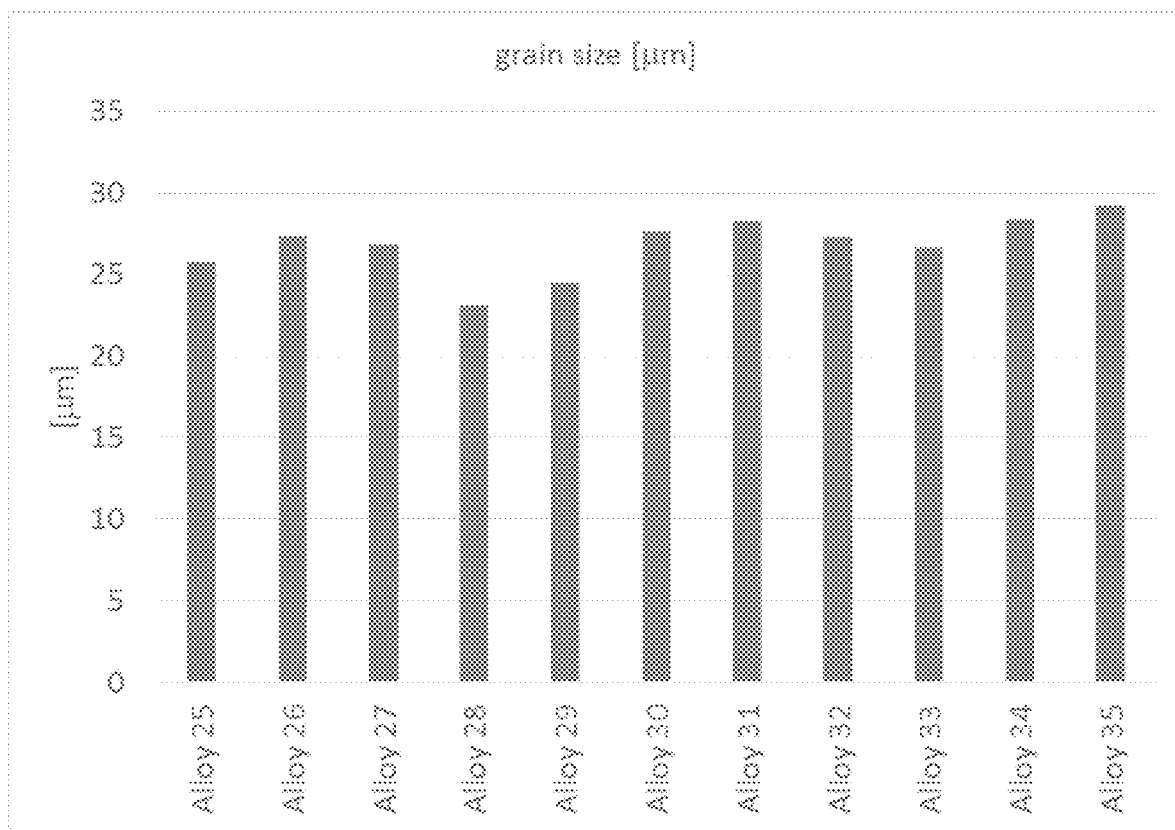
FIG. 24 is a graph depicting grain size measurement for exemplary alloys as described herein.
Figure 25B:
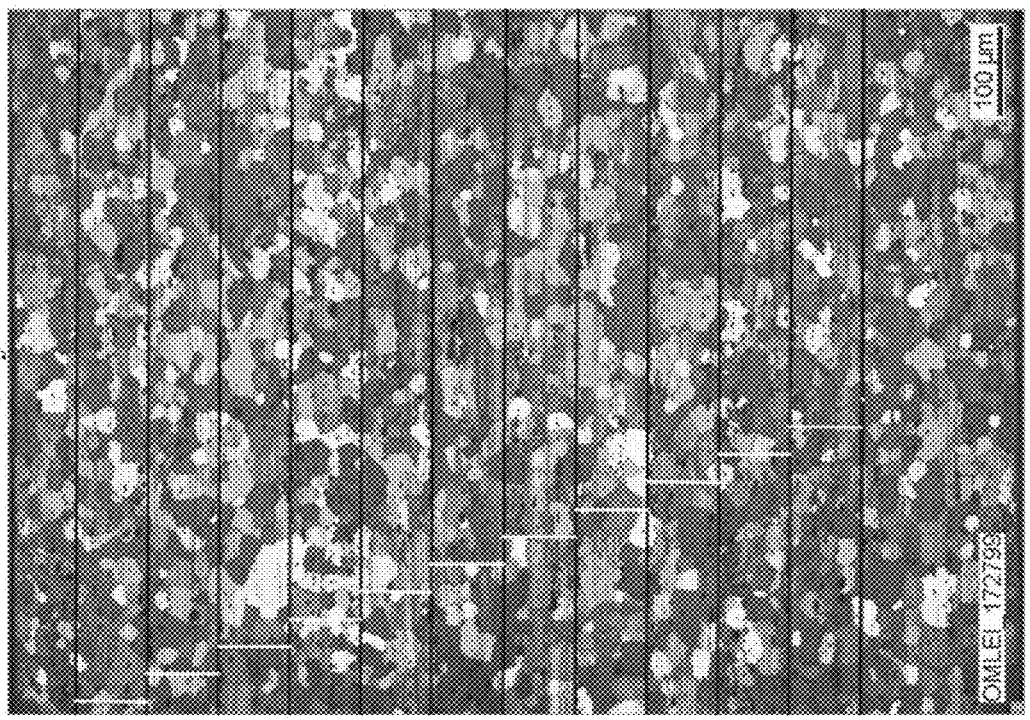
FIG. 25B shows grain structure images for an exemplary Alloy 32 as described herein.
Figure 25A:
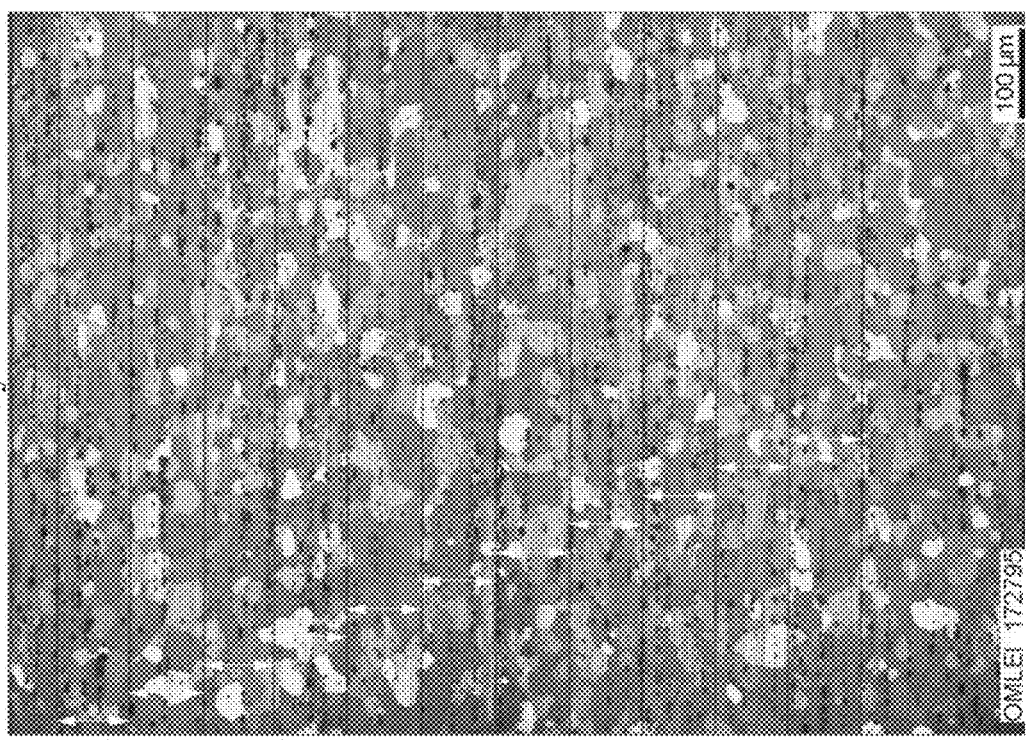
FIG. 25A shows grain structure images for an exemplary Alloy 28 as described herein.

As shown in FIG. 24, increasing the amount of Si, Cu, Mg and Zn in the clad alloy can affect the grain size. The smallest average grain size for exemplary alloys 25 to 33 was observed in Alloy 28 (FIG. 25A) and largest average grain size was observed in Alloy 32 (FIG. 25B). Alloys 34 and 35 demonstrate the effect of adding Ta and Hf, respectively. All exemplary Alloys 25 through 35 demonstrated grain sizes less than 30 microns.

Strength

Figure 26A:
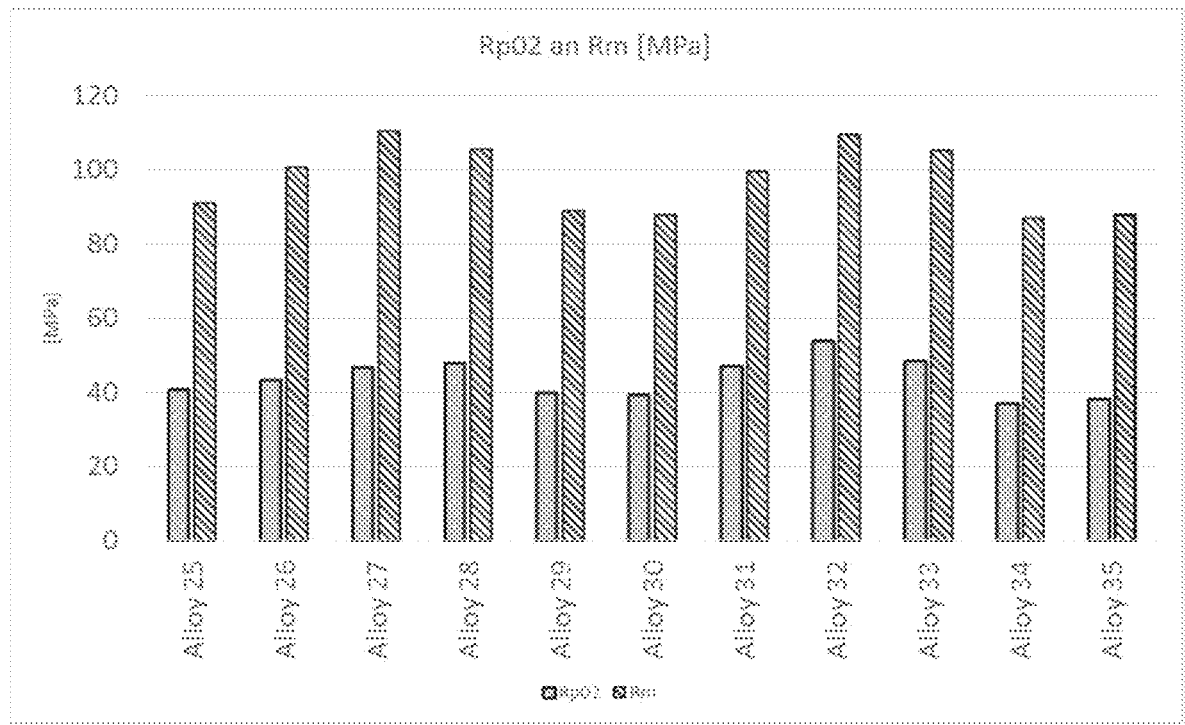
FIG. 26A is a graph depicting the yield strength (Rp0.2) and tensile strength (Rm) for exemplary alloys. The left histogram bar of each set represents the yield strength (Rp0.2). The right histogram bar of each set represents the tensile strength (Rm).
Figure 26B:
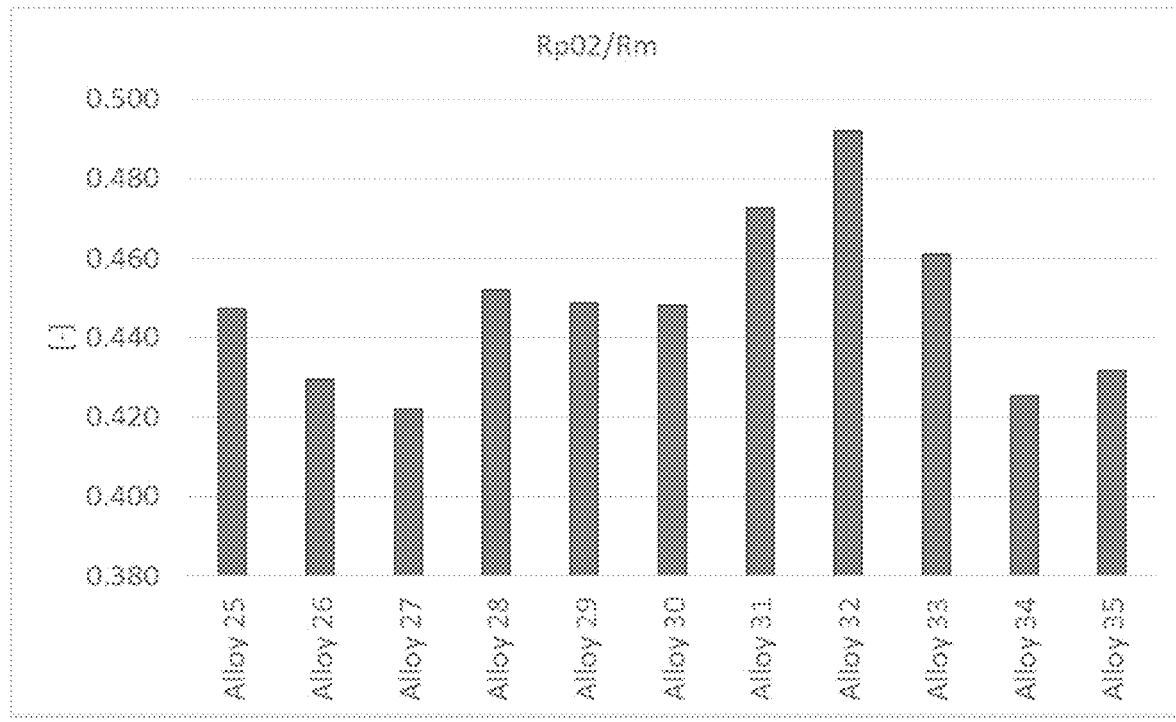
FIG. 26B is a graph depicting the ratio of Rp02/Rm for exemplary alloys measured 90° to the rolling direction.

FIGS. 26A and 26B show histograms of the results of the yield point elongation test (Rp02, FIG. 26A) and ultimate tensile test (Rm, FIG. 26B). The tests were conducted according to standard DIN EN ISO 6892-1:2009, at 90° (transverse) to the rolling direction. The increase of Cu from 0.05 wt. % to 0.41 wt. % showed an improvement of the Rp02/Rm ratio, shown when comparing Alloy 25 to Alloy 27.

SUMMARY

In some cases, increasing the amount of Si, Mg, Cu and Zn in exemplary alloys 25 through 33 did not reduce the grain size. However, as seen in Alloys 34 and 35, the addition of Ta (Alloy 34) and Hf (Alloy 35) can slightly increase grain size in the alloy, but the average grain size remains less than 30 microns.

All patents, publications and abstracts cited above are incorporated herein by reference in their entirety. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the present invention as defined in the following claims.

What is claimed is:

1. An aluminum alloy for a cladding layer, the aluminum alloy comprising 0.2 to 0.6 wt. % Fe, 0.06 to 0.25 wt. % Mn, up to 0.25 wt. % Si, up to 0.5 wt. % Cu, up to 1.5 wt. % Mg, up to 0.4 wt. % Zn, one or more additional elements selected from the group consisting of Ni, Ti, Co, Nb, Cr, V, Zr, Hf and Ta, up to 0.15 wt. % impurities, and Al; wherein the aluminum alloy comprises a total amount of Ni, V, and Co greater than 0.20 wt. %; wherein at least one of Ni or Co is present in an amount of 0.05 to 0.60 wt. %; wherein the aluminum alloy comprises grains having an average grain size from 10 microns to less than 30 microns;
   wherein the aluminum alloy is subjected to hot rolling to produce a rolled aluminum alloy product;
   wherein the rolled aluminum alloy product exhibits an elongation at break of at least 20% in directions longitudinal, transverse, and diagonal to a rolling direction of the rolled aluminum alloy product; and
   wherein the rolled aluminum alloy product exhibits a bend angle of lower than 9° after being subjected to uniaxial pre-straining at 15% at 90° to the rolling direction and/or ageing at 180° C. for up to 10 hours.

2. The aluminum alloy of claim 1, comprising 0.25 to 0.55 wt. % Fe, 0.08 to 0.20 wt. % Mn, up to 0.25 wt. % Si, up to 0.25 wt. % Cu, up to 0.25 wt. % Mg, up to 0.20 wt. % Zn, one or more additional elements selected from the group consisting of Ni, Ti, Co, Nb, Cr, V, Zr, Hf and Ta, up to 0.15 wt. % impurities, and Al.

3. The aluminum alloy of claim 1, comprising 0.25 to 0.55 wt. % Fe, 0.08 to 0.20 wt. % Mn, up to 0.12 wt. % Si, up to 0.05 wt. % Cu, 0.3 to 1.2 wt. % Mg, up to 0.05 wt. % Zn, one or more additional elements selected from the group consisting of Ni, Ti, Co, Nb, Cr, V, Zr, Hf and Ta, up to 0.15 wt. % impurities, and Al.

4. The aluminum alloy of claim 1, wherein the one or more additional elements comprises Ti in an amount of from 0.01 to 0.15 wt. %.

5. The aluminum alloy of claim 1, wherein the one or more additional elements comprises V in an amount of from 0.01 to 0.2 wt. %.

6. The aluminum alloy of claim 1, wherein the one or more additional elements comprises Ni in an amount of from 0.01 to 0.60 wt. %.

7. The aluminum alloy of claim 1, wherein the one or more additional elements comprises Co in an amount of from 0.01 to 0.60 wt. %.

8. The aluminum alloy of claim 1, wherein the one or more additional elements comprises Nb in an amount of from 0.01 to 0.3 wt. %, Cr in an amount of from 0.01 to 0.2wt. %, Zr in an amount of from 0.01 to 0.25 wt. %, Hf in an amount of from 0.01 to 0.30 wt. %, or Ta in an amount of from 0.01 to 0.20 wt. %.

9. The aluminum alloy of claim 1, comprising 0.2 to 0.5 wt. % Fe, up to 0.25 wt. % Si, up to 0.25 wt. % Cu, 0.1 to 0.2 wt. % Mn, up to 0.1 wt. % Mg, up to 0.15 wt. % Cr, up to 0.20 wt. % Zn, up to 0.6 wt. % Ni, up to 0.12 wt. % Ti, up to 0.6 wt. % Co, up to 0.2 wt. % Nb, up to 0.18 wt. % V, up to 0.25 wt. % Zr, up to 0.30 wt. % Hf, up to 0.15 wt. % Ta, up to 0.15 wt. % impurities, and Al.

10. The aluminum alloy of claim 1, wherein the combined content of Fe, Mn, Cr, Ti, Co, Ni, and V present in the aluminum alloy ranges from 0.60 wt. % to 0.90 wt. %.

11. The aluminum alloy of claim 1, wherein the average grain size is from 15 microns to 25 microns.

12. The aluminum alloy of claim 1, wherein the aluminum alloy comprises 0.05 wt. % to 0.15 wt. % Ti.

13. A multi-layer metal sheet comprising:
a core layer,
a first cladding layer comprising an aluminum alloy comprising 0.2 to 0.6 wt. % Fe, 0.06 to 0.25 wt. % Mn, up to 0.20 wt. % Si, up to 0.5 wt. % Cu, up to 0.45 wt. % Mg, up to 0.4 wt. % Zn, one or more additional elements selected from the group consisting of Ni, Ti, Co, Nb, Cr, V, Zr, Hf and Ta, up to 0.15 wt. % impurities, and Al, and
a second cladding layer,
wherein the core layer comprises a first side and a second side, and the first cladding layer is adjacent to the first side of the core layer to form a first interface and the second cladding layer is adjacent to the second side of the core layer to form a second interface,
wherein the first cladding layer comprises Fe, Mn, Cr, Ti, Co, Ni and V such that the total weight-percent (wt. %) of the Fe, Mn, Cr, Ti, Co, Ni, and V is between 0.60 wt. % and 0.90 wt. %.

14. The multi-layer metal sheet of claim 13, wherein the core layer comprises an AA6xxx alloy, an AA2xxx alloy, an AA5xxx alloy, or an AA7xxx alloy.

15. A product prepared from the multi-layer metal sheet of claim 13, wherein the product is a motor vehicle body part.

16. The product of claim 15, wherein the motor vehicle body part is a body side panel.

* * * * *